United States Patent [19]

Minshull et al.

[11] 4,290,084
[45] Sep. 15, 1981

[54] METHOD AND MEANS FOR PRESERVING ORIGINAL CONTINUITY/DISCONTINUITY AMONG SAME COLORED PEL CLUSTERS UPON ARRAY COMPRESSION

[75] Inventors: John F. Minshull, Winchester, England; Pavel Brazdil, Edinburgh, Scotland

[73] Assignee: International Business Machines Corp., Armonk, N.Y.

[21] Appl. No.: 77,698

[22] Filed: Sep. 21, 1979

[30] Foreign Application Priority Data

Oct. 2, 1978 [GB] United Kingdom ............... 38998/78

[51] Int. Cl.³ .............................................. H04N 1/00
[52] U.S. Cl. .................................... 358/260; 358/284; 358/287
[58] Field of Search ............... 358/260, 287, 282, 283, 358/284; 364/515

[56] References Cited

U.S. PATENT DOCUMENTS

| | | | |
|---|---|---|---|
| 3,813,485 | 5/1974 | Arps | 358/133 |
| 3,987,412 | 10/1976 | Morrin | 340/146.3 AE |
| 4,020,462 | 4/1977 | Morrin | 340/146.3 AE |
| 4,028,731 | 6/1977 | Arps | 358/260 |
| 4,124,870 | 11/1978 | Schatz et al. | 358/260 |

*Primary Examiner*—John C. Martin
*Assistant Examiner*—Edward L. Coles
*Attorney, Agent, or Firm*—R. Bruce Brodie

[57] ABSTRACT

Data manipulation apparatus is described for converting raster-scanned data received, for example, from a scanner 2 at a first picture element (pel) resolution to a second lower pel resolution for display, for example, on a CRT terminal 4. The apparatus includes a scale-changing means 8 which functions to replace selected subgroups of pels in the input image by single pels at its output. The significance of each single pel reflects the presence or absence of a pel representing part of an image object in the associated subgroup of pels. The number of pels in the selected subgroups are determined by the degree of compression required to convert to the lower pel resolution. Prior to scale change, the apparatus functions to modify the input data in order to minimize merging of adjacent image objects as a result of scale change and thereby improve the legibility of the output image at the lower resolution. The scanned data is first supplied to a data sensitive thinner 5 which detects narrow gaps between adjacent objects and selectively detects image object edge pels in order to widen the gap. The selectively thinned scanned data is then supplied to a further thinner 6 which removes excess image pels from selected edges of the image objects. The data from thinner 6 is then supplied to a data sensitive merge inhibit unit 7 which moves selected image object pels from a subgroup in which merging as a result of scale change will occur to an adjacent subgroup where merging will not occur. Removal of a pel by the selective thinner 5, or by the thinner 6 or movement of a pel by unit 7 is inhibited if to do so would result in fragmentation of the associated image object.

13 Claims, 116 Drawing Figures

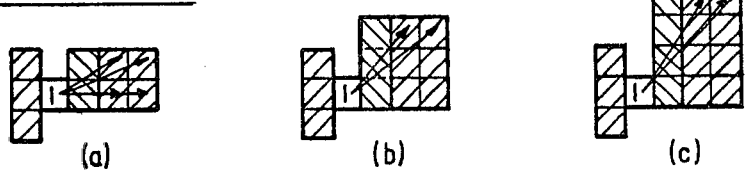
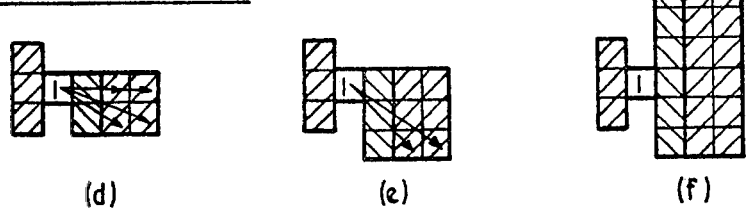
FIG. 13
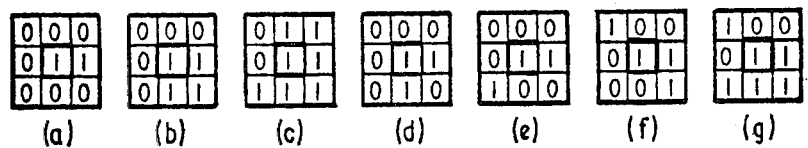
FIG. 14
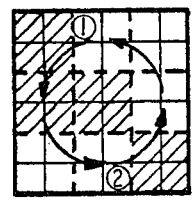
FIG. 15
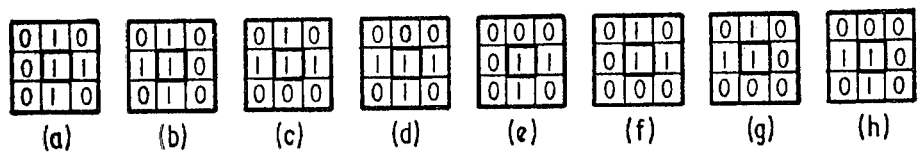
FIG 16

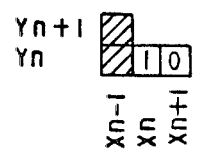
FIG. 35
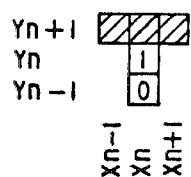
FIG. 36
| 0 0 0 | 0 1 0 | 0 0 0 | 0 0 0 | 0 0 1 | 1 0 0 | 0 0 0 | 0 0 0 |
| 0 1 1 | 0 1 0 | 1 1 0 | 0 1 0 | 0 1 0 | 0 1 0 | 0 1 0 | 0 1 0 |
| 0 0 0 | 0 0 0 | 0 0 0 | 0 1 0 | 0 0 0 | 0 0 0 | 1 0 0 | 0 0 1 |
| (a)   | (b)   | (c)   | (d)   | (e)   | (f)   | (g)   | (h)   |
FIG. 37

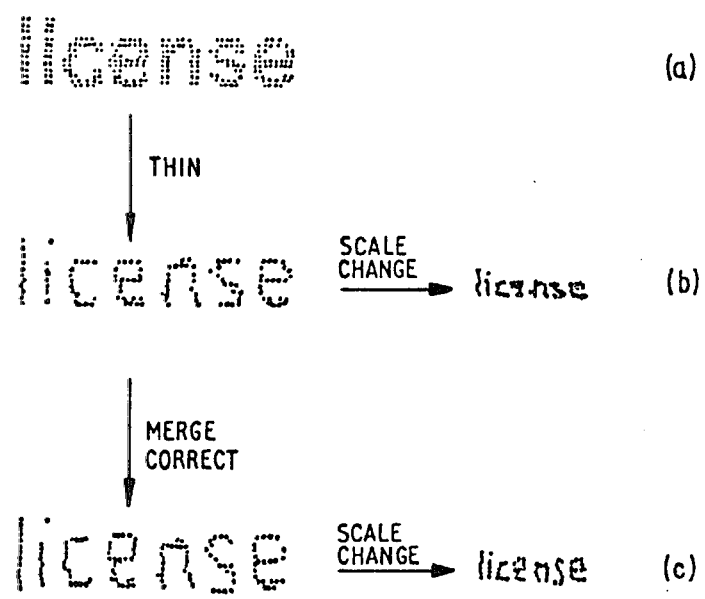
FIG. 40
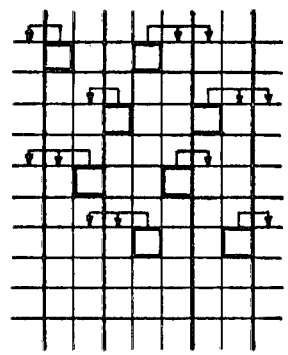 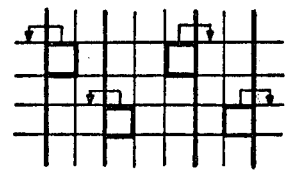
(a)　　　　　　(b)　　FIG. 41

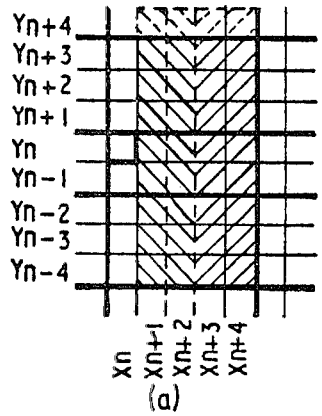
(a)
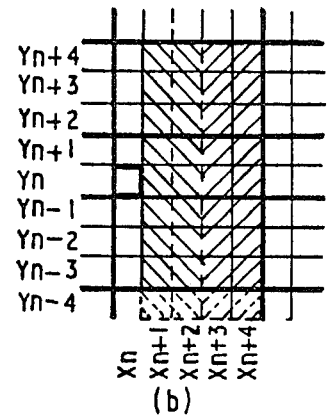
(b)
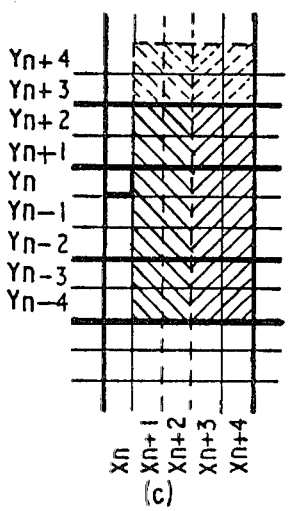
(c)
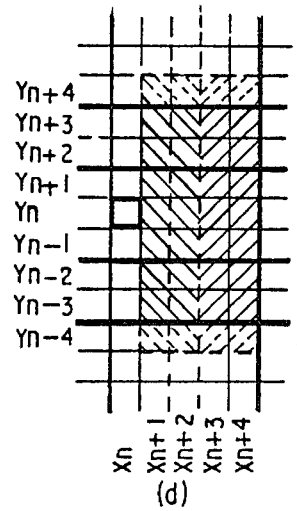
(d)
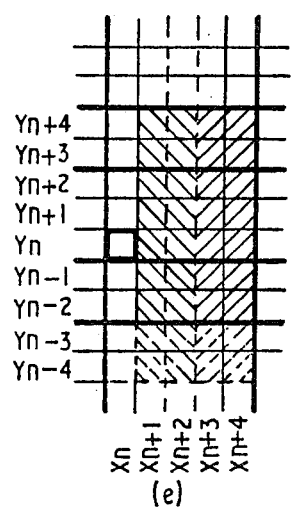
(e)
FIG. 43

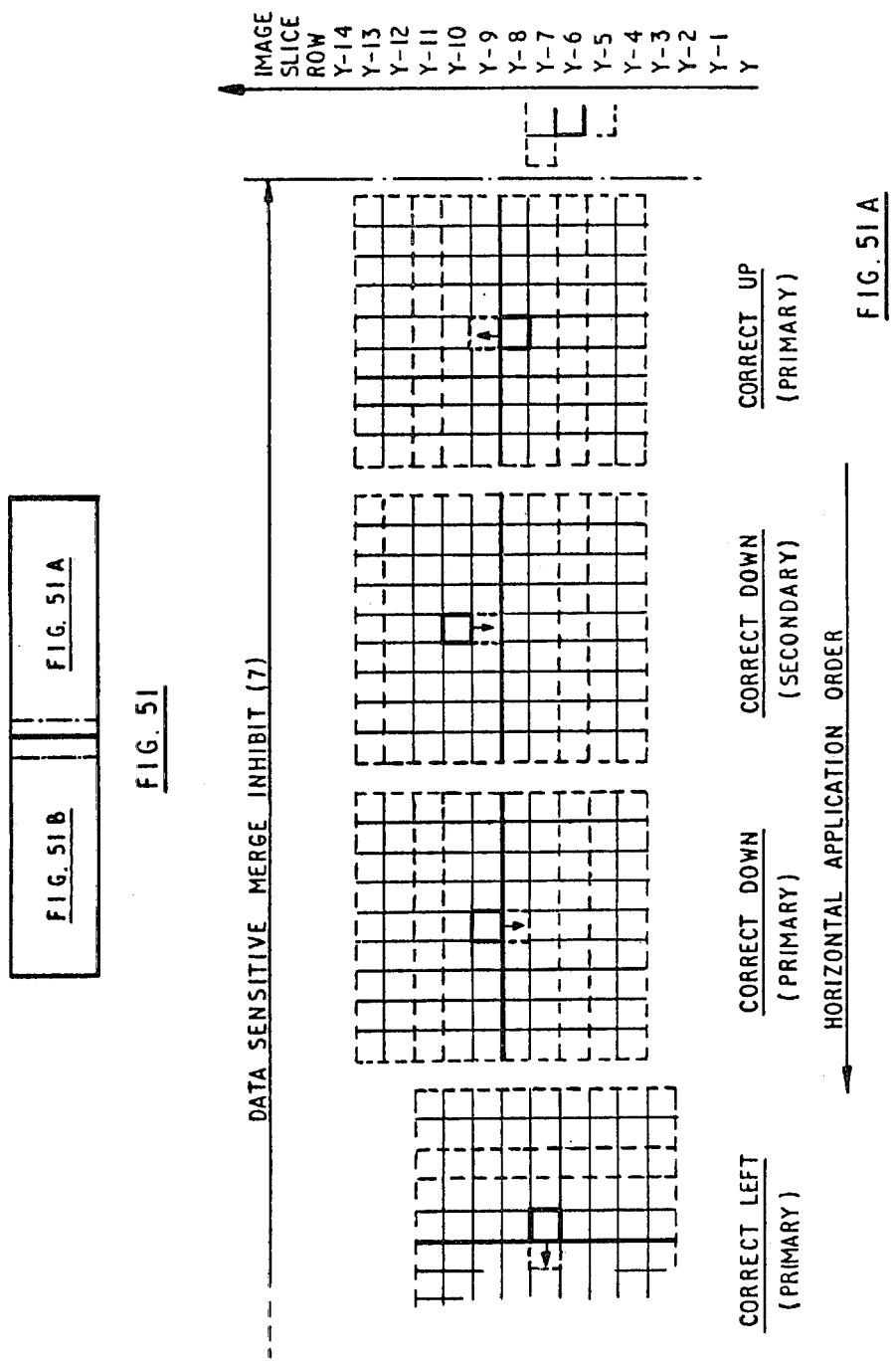

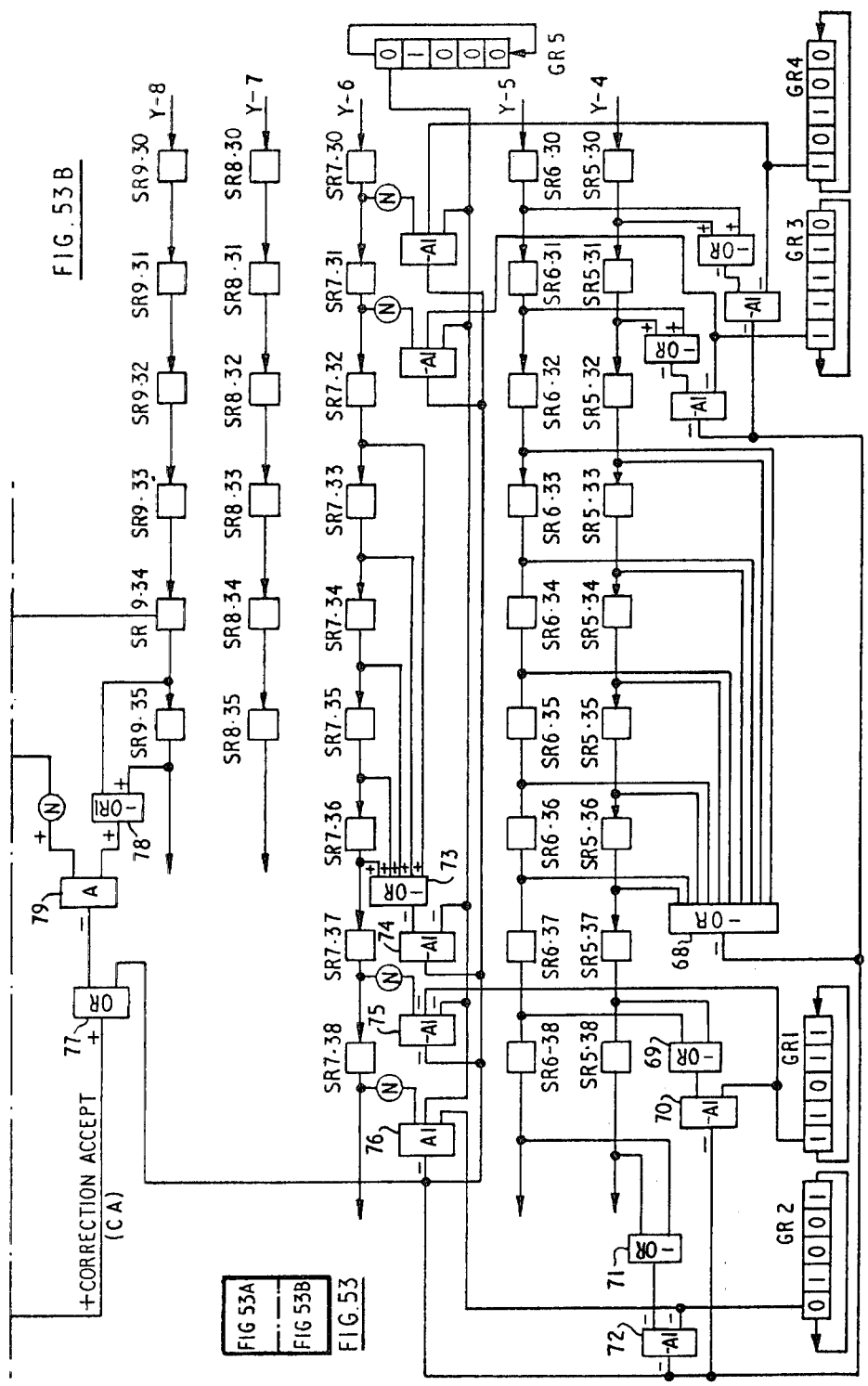

HORIZONTAL GATING 1 1 0 1 1    GR1 (3 PELS L)

0 1 0 0 1    GR2 (4 PELS L)

1 1 1 1 0    GR3 (3 PELS R)

1 0 1 0 0    GR4 (4 PELS R)

VERTICAL GATING 0 1 0 0 0    GR5 (ROW Y-6)

0 1 0 1 0    GR6 (PROJ. WINDOW BOUNDARIES)

METHOD AND MEANS FOR PRESERVING ORIGINAL CONTINUITY/DISCONTINUITY AMONG SAME COLORED PEL CLUSTERS UPON ARRAY COMPRESSION

FIELD OF USE

This invention relates to preserving connectivity or bifurcation among same colored pel clusters in a multicolored pel array undergoing electronic scale changing, and more particularly from a high to low order resolution scale change.

DESCRIPTION OF PRIOR ART

It has previously been proposed that documents could be scanned, digitized and stored electronically in a computer. The stored data could then be recalled from storage, reconstituted and either displayed on a display, printed with a printer/plotter, or transmitted over a data link for storage at another location. A document which is to be digitized can be scanned by a scanner whose output is a stream of bits which represent picture elements (pels) in successive lines of the raster scan. The resolution of a scanner is defined in terms of the number of pels per inch. Typical scanner output resolutions are 240, 120 and 96 pels/inch.

If during operation, a particular scanner produces an output in response to an input pel in the input image which is black over more than 50% say of the pel area but produces no output for pels with more than 50% white, then strokes in the input image which are thinner than 50% of the pel width will not be detected by the scanner resulting in stroke 'dropout'. Furthermore, inter-stroke gaps of less than 50% pel width will also go undetected by the scanner resulting in stroke merging. Clearly, therefore, the higher the scanner resolution, the greater the potential legibility of the subsequently displayed image. The visual benefits provided by high resolution sampling, however, are offset by the corresponding rapid increase in the volume of data required to represent the image. This increase is proportional to the square of the increase in linear resolution. For an A4 size document (approximately 8 by 12 inches) over 3 million pels are required to represent the document at a scanning resolution of 240 pels per inch. The requirements for electronic storage of such scanned documents can become prohibitively expensive.

The conflicting requirements of high resolution scanning and economic considerations limiting the amount of data to be stored can be potentially resolved by scanning the input image at high resolution and then compressing the data prior to storage. Various compression techniques have been proposed. For example, Arps, U.S. Pat. No. 3,813,485, "System for Compression of Digital Data", issued May 28, 1974, describes a technique in which a predictor predicts whether a pel is '1' or '0', that is 'on' or 'off'. The predicted pel is compared with the actual pel and an error signal is produced when they differ. These error signals are run-length encoded and the compressed data stored. A high order predictive error array and an array of all leading edges of objects in an image were used in combination to shorten run lengths and their number representations as taught in Arps, U.S. Pat. No. 4,208,731, "Apparatus for Compression Coding Using Cross Array Correlation Between Two Dimensional Matrices Derived From Two Valued Digital Images", issued on June 7, 1977. An alternative technique is set forth in Morrin, U.S. Pat. No. 3,987,412, "Method and Apparatus for Image Data Compression Utilizing the Boundary Following of the Exterior and Interior Borders of Objects", issued Oct. 19, 1976, in which a document is scanned in a raster until an object, for example a character, is located. The contour of the object is followed, recording each pel and moving to the next until the centre of the object is reached. The raster scan is resumed until the next object is encountered.

In some cases, subsequent display of the compressed image may require the resolution of the display device to be the same as that of the scanner producing the input data. Under circumstances where high resolution display devices are unavailable, these methods which rely solely on compression of the image data are unsatisfactory and an alternative solution must be sought.

A compromise solution is to scan the data at a high resolution and then to perform an appropriate scale change to enable the data to be displayed by the device at a lower resolution. Clearly, the legibility of the displayed image will depend on the nature of the technique used to effect the scale change from raster scanned data at a high resolution to the lower resolution required by the display device or printer.

A simple method of manipulation or consolidation of image data from 240 pels per inch to 120 pels per inch would be to perform a straightforward scale change projection from high to low resolution. This could be achieved by dividing the entire 240 pels per inch matrix from the scanner into sub-groups or 'windows' each two pels wide and two pels high and selecting, for example, the top left-hand corner from each window for projection onto the 120 pel per inch matrix required for the output display or printer. This 'unintelligent' method of consolidation would have a serious disadvantage in that it could cause discontinuities to form and spurious connections to be made in the final output image. For example, if a character in the input image is only one pel thick at some place and if the pel happens not to lie in the top left-hand corner of a 2×2 window, then a discontinuity occurs in the output image displayed or printed at the lower resolution. Similarly, character gaps which are only one pel wide can be eliminated during the scale change operation with the result that adjacent characters or parts of the same character merge together. Such spurious discontinuities and mergings could affect the legibility and overall quality of the output image to an unacceptable degree. The dual of this problem is that of outputting data at a resolution higher than originally scanned. This is illustrated by Shatz, et al, U.S. Pat. No. 4,124,870, "Method of Improving Print Quality of Coarse-Scan/Fine Print Character Reproduction", issued on Nov. 7, 1978. Here, the concern relates to filling in the gaps between successive scans for printing/display purposes instead of the instant problem of preserving bifurcations and avoidance of unnecessary fractures among same colored pel clusters. For prior art fracture avoidance, reference should be made to aforementioned Morrin patent at column 2, lines 49-59.

THE INVENTION

It is an object of the invention to devise a method and means for preserving continuities and discontinuities among clusters of the same first color valued pels originating in a m×n multicolored value pel array upon said array being compressed into a smaller size. It is a further object to manipulate or consolidate raster scanned data representing the array at a high resolution in order to enable display of an output image at a lower resolution. It is a related object to preserve the topological relation among clusters having critical dimensions such as single pel width or thickness where actual data loss due to array size reduction is incurred.

The foregoing objects are satisfied by method steps prior to compression which include row major order scanning of the m×n array for detecting a bifurcation between clusters defined by at least one run of consecutive second color valued pels in at least one or more consecutive scan lines; and converting first color valued pels within a predetermined number of array positions contiguous to said bifurcation into second color valued pels. Fracture avoidance of critically dimensioned connections such as single pel width or thickness of clusters is obtained by further scanning and inhibiting of the conversion step.

Scale size array reduction or compression proceeds in the manner described in copending patent application U.S. Ser. No. 06/079,779, filed on Sept. 28, 1979, in which first a column and then a row reduction of the array is performed.

The invention objects are further satisfied by data manipulation apparatus for receiving raster-scanned data as a first series of bits indicative of individual objects forming an image at a first picture element (pel) resolution and for converting the data into a second series of bits indicative of the image at a second lower pel resolution, comprising a scale changing means operable on receipt of said first series of input bits to convert selected subgroups of said input bits each into a single output bit, the significance of each output bit being determined by the presence or absence of a bit of a predetermined significance anywhere in the associated subgroup of input bits, the size of the subgroups being determined by the degree of compression required to effect the scale-change from said first to said second pel resolution, and means operable prior to scale change for investigating bits in adjacent subgroups and selectively to change the significance of one or more of said investigated bits, merging of said objects after scale change to said lower resolution would otherwise occur.

In order that the invention may be fully understood, a preferred embodiment thereof will now be described by way of example with reference to the accompanying drawing.

BRIEF DESCRIPTION OF THE DRAWING

FIGS. 13a–13f show the selected window design for the right thinner forming part of the sensitive thinner;

FIGS. 14a–14g show various configurations of image data to illustrate the need to maintain connectivity;

FIG. 15 shows how connectivity may be maintained using a simple window;

FIGS. 16a–16h show how T-junctions and corners are detected;

FIGS. 35 and 36 show the window conditions for a non-selective thinner forming part of the data consolidation apparatus;

FIGS. 37a–37h show how ends of thin lines are detected;

FIGS. 40a–40c illustrate the operation of the data consolidation apparatus on sample data;

FIGS. 41a–41b illustrate how merge correction can be used to preserve narrow gaps in the data;

FIGS. 43a–43e show window outline for a horizontal primary merge correction unit;

FIGS. 51a and 51b and FIGS. 52a and 52b show two parts of the merge correction unit in schematic form.

FIGS. 53a and 53b show in two parts the circuit details of a downward primary merge correction unit;

DESCRIPTION OF BEST MODE AND INDUSTRIAL APPLICABILITY

Figure 1:
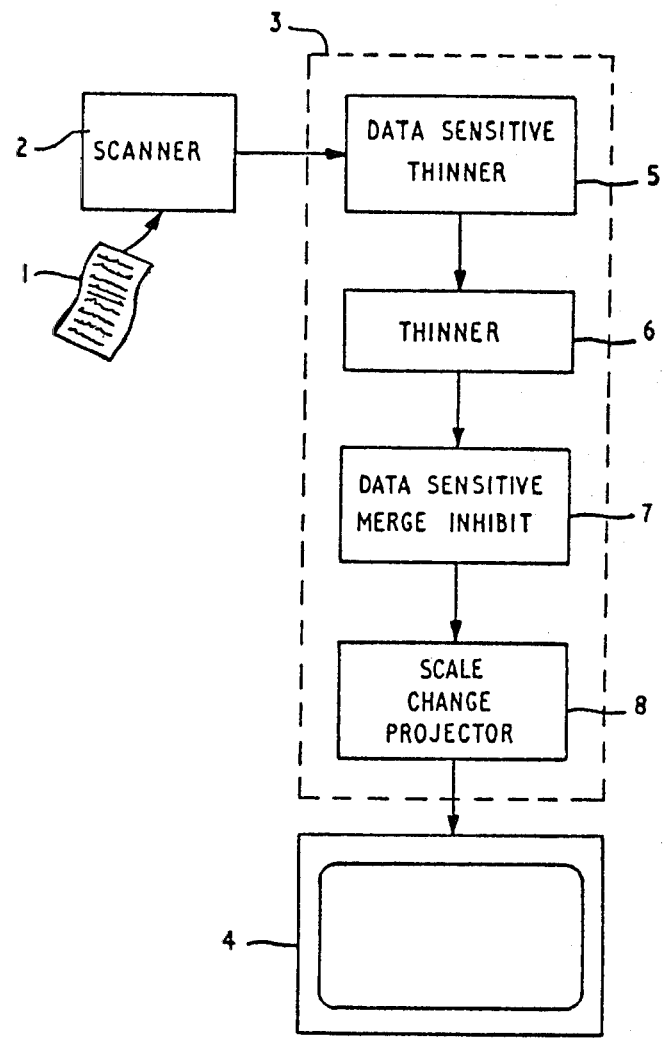
FIG. 1 shows in schematic form data manipulation or consolidation apparatus in accordance with the invention.

FIG. 1 shows data consolidation apparatus in which image data on a document 1 is scanned at a high resolution by scanner 2, consolidated in consolidation unit 3, and thereafter displayed at a low resolution on display screen 4. The scanner 2 produces a series of bits at its output representing light and dark areas or pels on the scanned document at the scanner resolution. The consolidation unit 3 includes a data sensitive thinner 5 wherein bits are selectively removed from the raster scanned input bit pattern in an attempt to preserve the spacial structure of the original image when displayed at the lower resolution; a non-selective thinner 6 which removes further bits from the bit pattern to leave a processed or modified bit pattern in which the bits represent predominantly single pel-wide lines; a data sensitive merge inhibit unit 7 which repositions discrete bits to minimize residual merge states in the processed image; and finally a scale change projector 8 which effects the scale change from the high resolution input (say 240 pels/inch) to the low resolution output (say 96 pels/inch).

Figure 2:
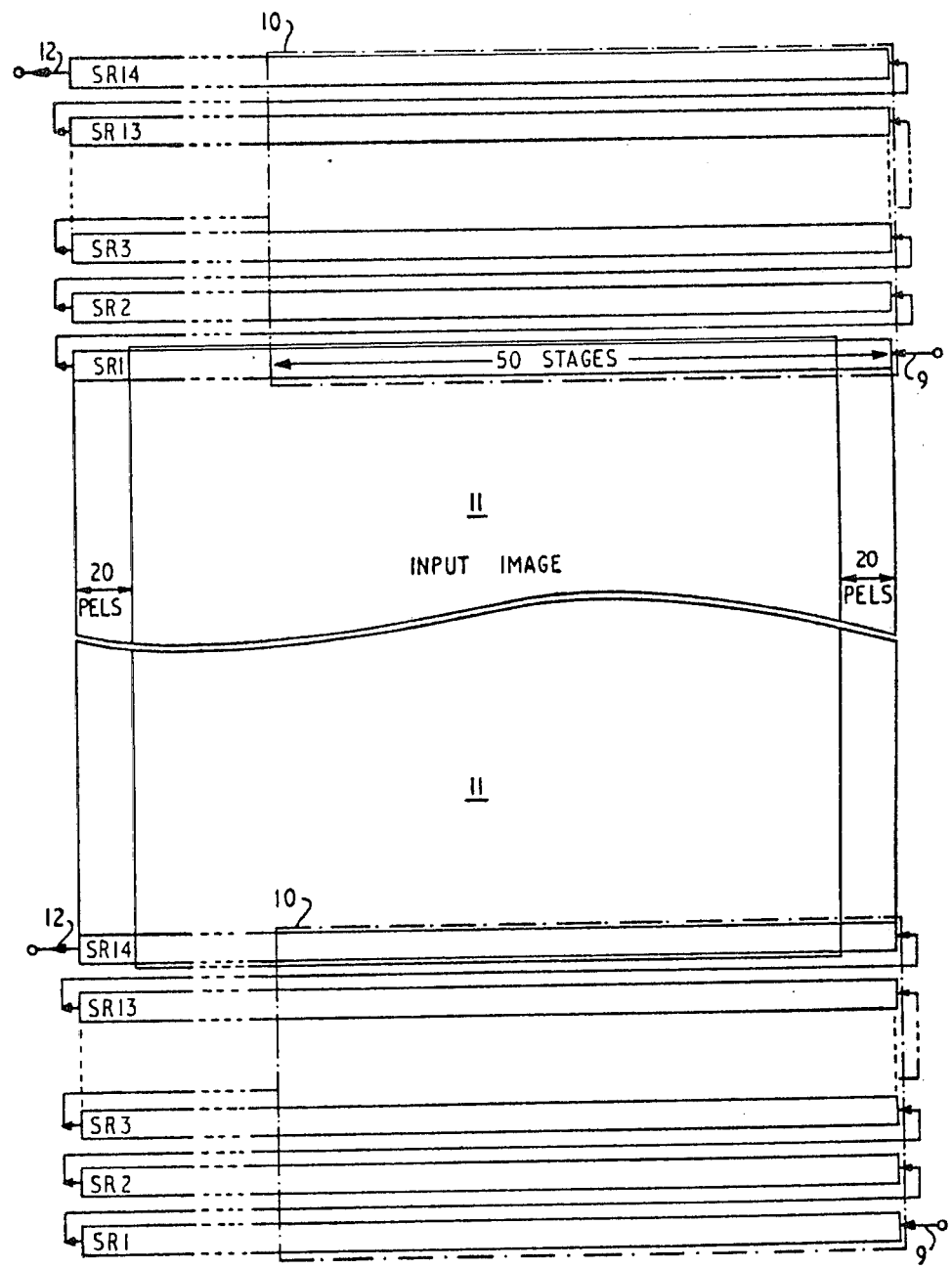
FIG. 2 shows an array of shift registers forming a part of consolidation apparatus and illustrates conceptually how a 'slice' of image data is processed through the registers.

The data consolidation unit 3 operates synchronously from the serial bit raster output which is applied to input terminal 9 of an array of fourteen serially inter-connected shift registers SR1-SR14, shown in FIG. 2. Each shift register has a capacity equal to the total number of bits (approximately 1600) in a single raster line scan of the image. At any one time, therefore, the array of shift registers contains up to fourteen rows of image data. The three consolidation functions prior to scale change projection are continuously performed on a relatively small 'slice' of image data (less than 50 bits wide) as it moves through the array of fourteen shift registers. The section of shift registers in which the 'slice' of image data is processed is shown by chain-dotted box 10 in FIG. 2.

The upper part of FIG. 2 represents conceptually the situation wherein the image 'slice' processed is in its initial position with respect to the shift registers with the first scan row of image data 11 contained in shift register SR1. The lower part of FIG. 2 represents the situation wherein the image 'slice' is in its final position with the last scan row of the image data 11 contained in shift register SR14. The processed image bit stream emerging from output terminal 12 is ready for the scale change projection required in order to display at the lower resolution.

During the description to follow of the two thinners 5 and 6 and the merge inhibit unit 7, repeated reference is made to the scale change projection subsequently to be performed on the processed image bit stream. Since the nature of the scale change projection imposes limitation on the preceding image data processing functions, it is useful to explain the principle of the projection function at this point. The description of the structure of the scale change projector is given later.

Projection is the function that performs the scale change necessary to convert image data supplied at a relatively high pel resolution to a form suitable for display at a relatively low pel resolution. Thus, in the case where the input image is derived from a scanner having a resolution of 240 pels per inch and the resolution of the display unit to which the image is to be supplied is only 96 pels per inch, the required scale change ratio is 5:2. That is, for every five image bits representing pels in the input image, only two image bits are supplied in the output image.

Clearly, the scale change ratio depends on the change in resolution from input to output and will vary with different mixes of apparatus. Thus, a simple scale change ratio of 2:1 is required for a scanner with a resolution of 240 pels per inch used with a display unit with a display resolution of 120 pels per inch. The non-integral scale change ratio of 5:2 presents more difficulties in implementation and has been selected as the preferred embodiment since it represents a more general case.

Figure 3:
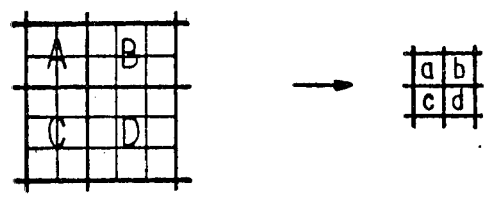
FIGS. 3, including A-D illustrates, shows the principle of operation of a scale change projector forming part of the consolidation apparatus.
Figure 4:
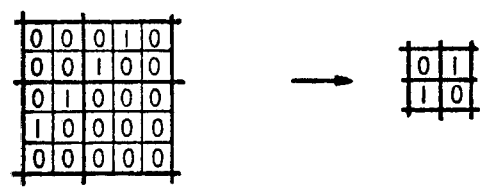
FIG. 4 shows an example of scale change projection where a feature in the input image is preserved in the output image.
Figure 5:
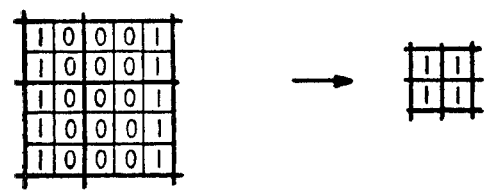
FIG. 5 shows an example of scale change projection where two features in the input image are merged.

FIG. 3 shows an array of $5 \times 5$ pels in the input image which is converted by the scale change projector to an output image array of $2 \times 2$ pels. In the figure, the input image array is shown divided into four sub-arrays or 'windows' ABCD and the output array similarly divided into four single pel 'windows' abcd. The window boundaries are represented by relatively heavy lines between the individual pel positions. As can be seen, the windows ABCD in the input image are not of equal size because the scale change of 5:2 is a non-integral ratio. The function of the projector is to derive a value for each position in the output array on the basis of the values of pels in the corresponding windows in the input array. A simple rule is applied that if there is at least one binary 1 bit in the input window representing a black pel in the original scanned image, then the corresponding window in the output array is set to a binary 1 bit to provide a black pel in the corresponding position in the output image. This rule insures that connectivity of black data in the input image is preserved during scale change projection. Thus, in FIG. 4, a thin black diagonal line in the input image is not broken or lost during scale change projection and appears in the output image. At the same time, however, as is illustrated in FIG. 5, two vertical quite widely separated lines in the original input image are merged into a single line in the output image as a result of the scale change projection. Such merges result in a consequent reduction of legibility of the displayed output image. It is for this reason that the scale change projection is preceded by the two thinning and one merge inhibit operations.

Figure 6:
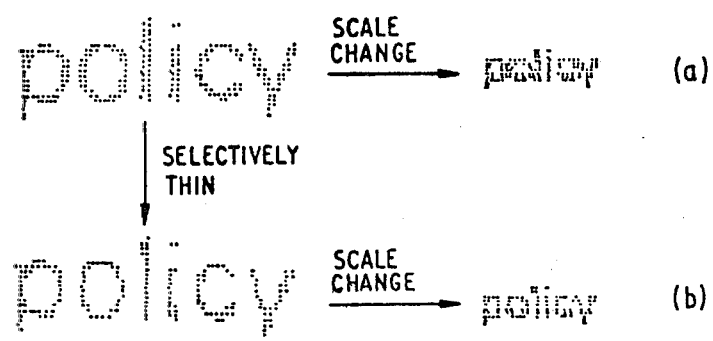
FIGS. 6a and 6b illustrate the operation of a data sensitive thinner, forming part of the consolidation apparatus, on sample data.

Many potential merges which can occur as a result of projection are prevented by data sensitive or selective thinning of the input image prior to the scale change projection. FIG. 6 illustrates the operation of the data sensitive thinner 6 on sample data. Thus an original pel input image is shown in FIG. 6a before and after scale change projection. The final image illustrates the inter-character merging which results. FIG. 6b shows the same input image after selective thinning again before and after projection. The final image in this case shows comparatively good character separation.

Figure 7:
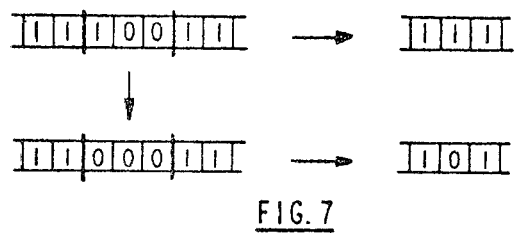
FIG. 7 shows how narrow gaps can be preserved in the output image by manipulating the input data.

The object of the thinner is to delete bits from the original image so as to preserve narrow gaps after scale change projection. Thus, for example, in the upper part of FIG. 7 a typical bit stream is shown representing, by the two binary 0's, a two pel wide gap separating two black features. The phasing of the projection windows with respect to the data is such that this two pel wide gap falls in a three pel wide projection window and, by applying the scale change rules, is eliminated in the output image. If, however, prior to scale change projection, the gap is extended horizontally one pel to the left as shown in the lower half of FIG. 7 then, after projection, a narrow gap is retained in the output image.

Figure 8:
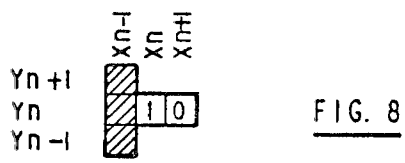
FIG. 8 shows a simple logical window for detecting a right-hand edge of a sequence of black pels.

These narrow gaps are detected by the sequential investigation of each pel in the input image in relation to surrounding pels. The investigation is by means of a simple logical window based on a selected pel position. FIG. 8 shows a simple case of a window consisting of a group of five pels (pel columns are nominally labelled $Xn$, $Xn+1$, $Xn+2$ ..., pel rows are labelled $Yn$, $Yn+1$, $Yn+2$ ...) used to detect the presence of a right-hand edge of a sequence or block of black pels. The window is based on pel position $(Xn,Yn)$ which is the pel under investigation. The values of the bits in the remaining pel positions give the various alternative configurations which satisfy the window conditions and lead to the detection of a right-hand edge in the input data between the investigated pel position and its neighboring pel position $(Xn+1,Yn)$. Thus, in the figure, the crosshatching extending upwards from left to right through row $Xn-1$ represents the requirement that the logical OR of the bits in those pel positions should be 'ONE'. That is, one or more of the pels in the input image corresponding to that row must be black. Similarly, the investigated pel $(Xn,Yn)$ must be black and its neighboring pel $(Xn+1,Yn)$ must be white. With these conditions satisfied, a right-hand edge is identified between pel $(Xn,Yn)$ and pel $(Xn+1,Yn)$.

Figure 9:
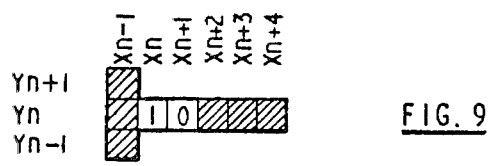
FIG. 9 shows a simple logical window for detecting a narrowe gap between a right-hand edge and adjacent data.

The edge detection window is extended as shown in FIG. 9 in order to detect a narrow gap between such an edge and adjacent data. The window is extended three pel positions to the right in row $Yn$. The crosshatching indicates as before the requirement that the logical OR of the bits in those pel position should be 'ONE'. That is, one or more pels in the input image corresponding to these three pel positions must be black. It is seen therefore that this logical window will detect gaps of 1, 2 or 3 pel widths between a right-hand edge and adjacent data in the row under consideration. The gap can therefore be extended, if desired, by deletion of the pel in position $(Xn,Yn)$.

Figure 10:
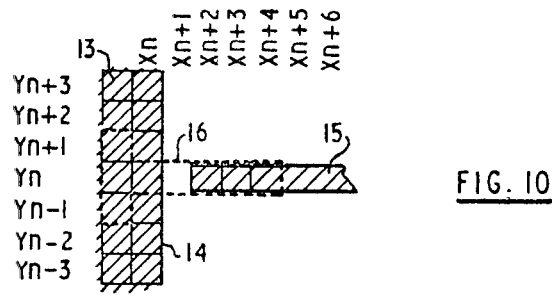
FIG. 10 shows the simple window shown in FIG. 9 in relation to typical image data.

FIG. 10 shows an image portion which consists of a block of ON-pels 13 representing a black feature having a right-hand edge 14 and an adjacent narrow horizontal line 15 of ON or black pels separated from the right-hand edge by a single pel position, that is a gap one pel wide. During the row-by-row sequential investigation of the image pels using the gap detection window shown in FIG. 9, the situation eventually arises in which the window is positioned as shown in dotted outline 16, investigating pel position $(Xn,Yn)$. The image data present at that time fulfills the narrow gap window conditions thus enabling pel $(Xn,Yn)$ to be deleted so extending the gap in row $Yn$ one pel position to the left. Consideration of the corresponding situations in the preceding row $Yn-1$ and succeeding row $Yn+1$ shows that, in the absence of image data in pel positions $Yn+2$, $Yn+3$ or $Yn+4$ or rows $Yn-1$ and $Yn+1$, the window requirements are not satisfied and the corresponding pels $(Xn,Yn-1)$ and $(Xn,Yn+1)$ are not deleted.

Figure 11:
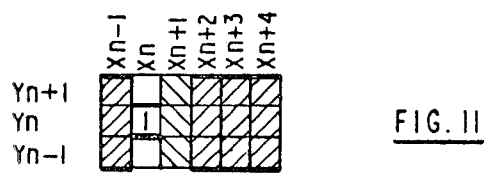
FIG. 11 shows an extended gap detection window.

The gap detection window shown in FIG. 11 overcomes this limitation. In this figure, the crosshatching extending downwards from left to right represents the condition in which the logical AND of the pels in that column is ZERO. Thus, the window conditions are met by image data in which the OR of pels in column $Xn-1$ is ONE, pel $(Xn,Yn)$ is ONE, all pels in column $Xn+1$ are ZERO, and the OR of pels in columns $Xn+1$, $Xn+2$, $Xn+3$ are all ONE. When these conditions are satisfied, deletion of pel $Xn,Yn$ from the image data may be initiated. It is seen that the use of this window on row $Yn-1$ and row $Yn+1$ of the image data shown in FIG. 10 results in deletion of pels $(Xn,Yn-1)$ and $(Xn,Yn+1)$ respectively. From these examples, it will be realized that, if desired, further pels along the edge can be deleted simply by extending the window dimensions.

Figure 12:
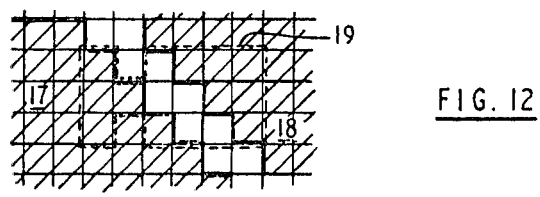
FIG. 12 shows the window shown in FIG. 11 in relation to typical image data.

FIG. 12 shows a portion of image data in which the narrow gap is diagonally inclined between two blocks of data 17 and 18. In this case, the window conditions for deletion of pel $(Xn,Yn)$ are not satisfied because column $Yn+1$ does not contain all ZEROs. The window is shown in dotted outline 19.

Window design is selected so that the stimulus for deletion of a pel under investigation comes from near axial neighbors, diagonal and sub-diagonal neighbors. Thus, in the selected practical implementation, the right thinner includes five different windows which are used in parallel to test the image data. These five windows are shown in FIG. 13. The window in FIG. 13(a) provides axial stimuli for deletion of the pel under investigation from 2 and 3 pel distance and also from two pels in two anti-clockwise sub-diagonal directions. The stimulus directions are indicated by arrows extending from the pel under investigation. FIG. 13(b) extends the stimuli to one further anticlockwise sub-diagonal pel and to a diagonal pel. FIG. 13(c) extends the stimuli to a further diagonal pel and to another sub-diagonal pel rotated further in an anti-clockwise direction. FIGS. 13(d) and 13(e) show windows providing corresponding stimuli for pel deletion in a clockwise direction. The selection of window conditions for the right thinner shown in FIG. 13 does not include a window with clockwise stimuli corresponding to the two additional anti-clockwise stimuli in FIG. 13(c) for reasons of economy as will become apparent later. The outline of the complete right thinner including all five sub-windows is shown in FIG. 13(f). This outline will appear in subsequent figures in which the right thinner is used. It should be pointed out that selection of window conditions is a matter of design choice in which the advantages of extending the pel deletion stimuli are weighed against the additional cost of implementation.

The selective thinner requires the integration of such thinning windows which perform corresponding thinning operations in all four possible orientations, that is, from the right as described above and shown in FIG. 13, from the left, from below, and from above. Thus, thinning from the left is achieved by a left thinner which is essentially the mirror image of the right thinner described with reference to FIG. 13 but extended to be symmetrical about the horizontal axis. Thinning from above is achieved by a top thinner which is essentially the same as the left thinner rotated clockwise through 90°. Thinning from below is achieved in practice by a number of bottom thinners each of which is largely mirror image of the top thinner. The thinning windows of the data sensitive thinner have been designed to desensitize the thinners from the effect of scanner dropout. A minimum gap of two vertical pels is required to initiate horizontal thinning, a minimum gap of two horizontal pels is required to initiate vertical thinning. Details of the actual sizes and shapes of the thinners will be given later after a discussion of the various alternatives available. The actual number of component windows required, their relative positions in these thinners and their operating sequence have been selected in an attempt to minimize merging and to generate a neutral and symmetrical interpretation as a thinned result. The various constraints and considerations of alternative arrangements which led to the final selection will not be described.

A pel will not be removed if its removal would alter the connectivity of the objects in the input data. This first constraint is illustrated in FIG. 14 which shows various 3×3 window configurations in which the central pel is being examined. The condition for removal is satisfied if the number of separate components in the eight neighbors of the central pel is exactly one. The number of components is determined by logically traversing a circular path around the central pel by way of the eight neighbors as shown in FIG. 15. The number of white to black transitions between consecutive axial (nondiagonal) neighbors is counted to obatin a 'crossing number'. A black to white transition does not increment the count. Nor is the count incremented for a move between two consecutive black axial neighbors via an intervening white diagonal neighbor. In other words, the count can only be incremented when moving from a white axial neighbor: whether the count will then be incremented depends on whether either of the immediately following diagonal neighbor or the following axial neighbor is black. Thus in the example shown in FIG. 15, the count is 2. If the crossing number is 2, 3, or 4, the central pel is essential to maintain connectivity and removal is inhibited during the thinning process. Inspection of the various input configurations in FIG. 14 shows that the central pel is deleted in examples (a) to (d) but deletion is inhibited in examples (e), (f) and (g). This connectivity constraint is applied only to those pels marked by the thinner for deletion.

A pel will not be deleted if it is identified as a corner or a T-junction pel. The logical operators necessary for determining whether or not the pel is located at the center of a T-junction are shown in FIGS. 16a to d and the operators for determining whether or not the pel is located at a corner are shown in FIGS. 16e to h.

Figure 17:
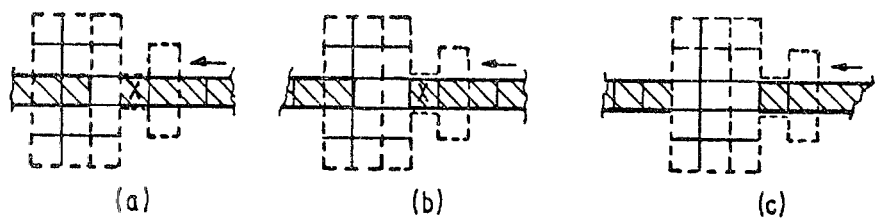
FIGS. 17a–17c show how progressive thinning of data can occur with a left thin operation.
Figure 18:
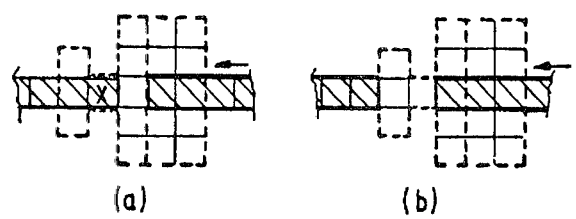
FIGS. 18a and 18b show the effect on data during a right thin operation.

The selective thinner operates by removing all pels which will cause merging at the target resolution providing they are not retained by the connectivity logic. Excessive deletions from open ends are normally prevented by the limited range of the thinning windows. This safeguard is not always able to prevent progressive deletion of a line. Thus, for example, as shown in FIG. 17a, data (shown crosshatched) consisting of two single pel horizontal lines separated by a 1-pel gap entering a left thinner (shown in dotted outline) in the direction of the arrow, will result in deletion of the pel in position X of the window. The situation 1-pel time later is shown in FIG. 17b in which it is seen that the pel under investigation in position X is again deleted. The process is stopped 1-pel time later as shown in FIG. 17c, because the window conditions are no longer satisfied. Clearly, a window design in which pel deletion stimulus is obtained from more distant pels will result in further pel stripping. Even so, the initial 1-pel gap has been extended in a relatively uncontrolled manner to a 3-pel gap. In contrast, FIG. 18 shows the same data entering a right thinner. The window conditions are satisfied initially as shown in FIG. 18a and the pel in position X is deleted. The situation 1-pel time later is shown in FIG. 18b where, it is seen that the window conditions are not satisfied and no further pel is deleted.

It will be apparent from the foregoing that a similar problem exists with vertical thin lines initially separated by a 1-pel gap. Such lines will be progressively thinned by a top thinner to produce a 3-pel gap whereas no such problem is experienced with a bottom thinner. This undesirable effect of uncontrolled pel deletion by the left and top thinners which leads to rapid distortion of the pel structure is due to the direction of movement of input image data relative to thinner windows. For this reason, progressive top and left thinning is inhibited by continuously monitoring the state of the image data during each scan row. In the case of left thin operations, a delete inhibit latch is set as a result of a pel deletion determined by a left thinner and remains set until the entire feature being investigated, that is all the black pels in that particular group of pels, has passed through the thinner. In the case of top thin operations, the state of the image slice row being considered for top deletion is retained in a 'top deletion' register. This register is set by the top thinning operation and its contents are used to inhibit top edge deletion in corresponding positions in the next image row presented for the top thinning operation. With this technique, multiple pel removals from the top edges present in the input image are inhibited.

Although the problem of progressive horizontal pel stripping by a horizontal thinner and progressive vertical pel stripping by a vertical thinner is overcome, a further problem exists in that, under certain circumstances, narrow vertical lines can be completely eliminated by successive operations of left and right thinners.

Figure 19:
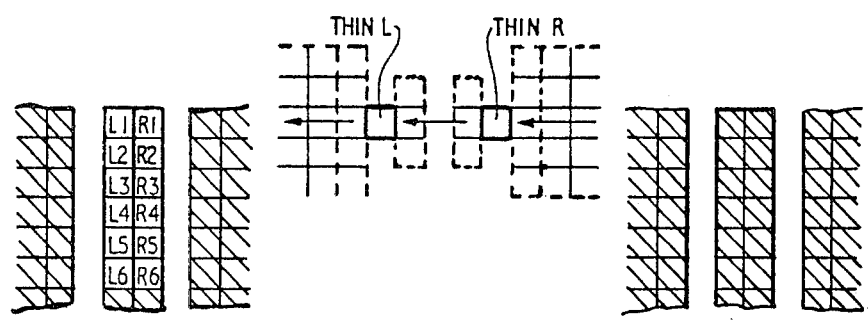
FIGS. 19, 20, 21, 22, 23, 24, 25, 26, 27 and 28 illustrate the effect of various relative window positions and application order with respect to typical image data.

FIG. 19 shows on its right-hand side, part of an input image having a 2-pel wide vertical line separated by a 1-pel gap on each side from further image data. As before, the image data is shown cross-hatched. This time, however, the thinner windows are not shown superimposed on the data. Instead, the window positions with respect to data and to each other are represented by correspondingly positioned single pels labeled THIN R and THIN L. These single pels represent the pels under investigation of the respective right and left thinner windows. The initial input data is shown as it is supplied line at a time to first a right thinner (THIN R) and then to a left thinner (THIN L), both of which are assumed to operate in sequence on the same scan line. The left-hand side of the figure shows the resulting progressive vertical deletion of the 2-pel line from the input image. Thus, the top right-hand pel of the 2-pel line is deleted by the first right thin operation R1 as the first line of the image slice passes through the right thinner. This is immediately followed by the top left-hand pel being deleted by the first left thin operation L1 as the first line passes through the left thinner. During the next scan line, the next right-hand pel is deleted by the second right thin operation R2 and this is followed by the deletion of the next left-hand pel by the second left thin operation L2. The process is repeated until the entire 2-pel wide line has been removed from the input image.

Vertical asymmetry between left and right thinners will prevent progressive deletion of this nature. More specifically, if the right thinner is used first and one data line delay is introduced between the right thinner and the subsequently applied left thinner, line retention is made possible by the particular pel configuration used for valid edge detection. This configuration requires the presence of an adjacent pel on or diagonal to the thinning axis to the one considered for deletion.

Figure 20:
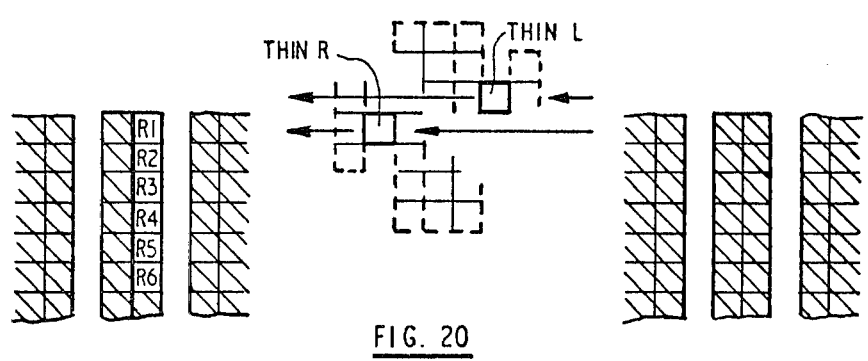

FIG. 20 shows the same input data as used in FIG. 19 this time applied to vertically offset left and right thinners. The horizontal offset has no significance in this figure and should be ignored. This vertical asymmetry between left and right windows is illustrated by the relative positions of the respective left and right positions of the pels to be investigated by the two thinners shown at the top of the figure and labelled THIN L and THIN R as before. Thus, it is seen that the first line of the image is processed by the right thinner THIN R resulting in deletion of the top right-hand pel by the first right thin operation R1. The second line of the image is also processed by the right thinner resulting in deletion of the next right-hand pel by the second right thin operation R2. When the data is applied to the left hand, the previous deletion of the two righthand pels removes the necessary stimulation for the left-hand window and no pel is deleted. Consequently, the thin line feature of the input image is retained in the output as shown on the left-hand side of FIG. 20.

Figure 21:
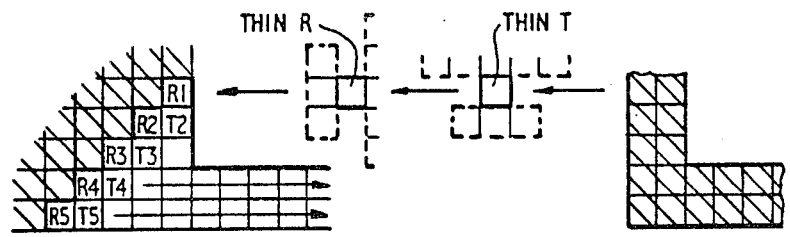
Figure 22:
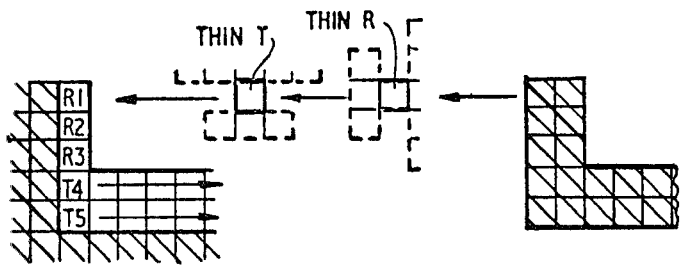

Thinning patterns are also determined by the interaction of thinning between vertical and horizontal axes. For this reason, the position and sequence of the thinning windows can modify the structure of the thinned result. In addition, different mixes of progressive and nonprogressive thinning interact differently. Many variations are available which give different results. For example, applying a top thinner before a right thinner without vertical offset establishes a thinning progression where each thinning operation takes advantage of the previous one. This example is shown in FIG. 21 using the same system for identifying relative window positions as before. The input data is shown on the left of the figure as an L-shaped feature with the results of the thinning operation on the left. It should be mentioned at this point that these examples being discussed are concerned with the effect of relative positions of thinning windows and whether or not the necessary stimulants are present for pel deletion has not been considered. Reversing the order of the thinning windows as shown in FIG. 22 overcomes the problem associated with this example and the alternate widening and deepening of the thinned area does not occur.

Figure 23:
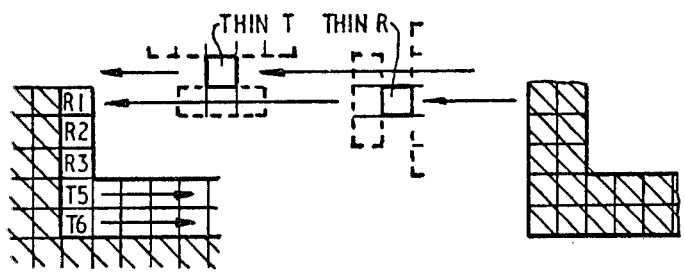
Figure 24:
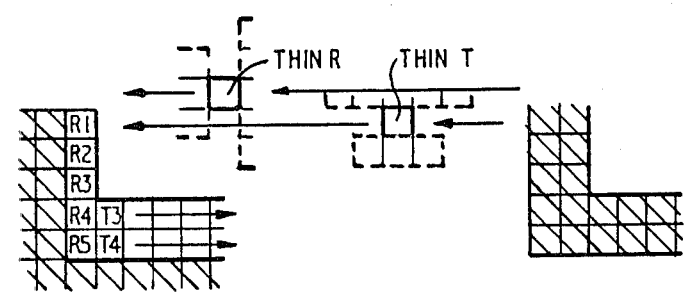

An alternative arrangement shown in FIG. 23 is to provide consecutive top and right thinning with positive vertical offset. Progressive thinning of the nature associated with the arrangement in FIG. 21 is always absent. The result is only marginally influenced by reversing the order of the window functions as shown in FIG. 24 in that an initial application of top thinning reduces the number of iterations required to complete the sequence.

Figure 25:
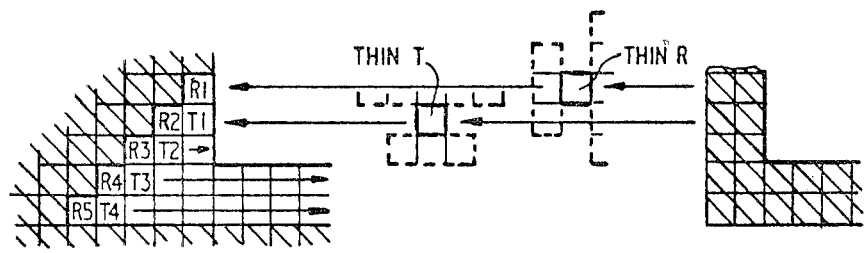
Figure 26:
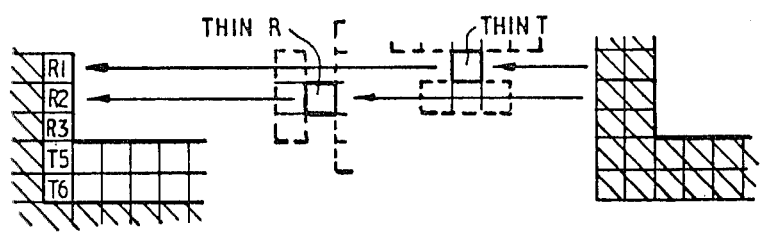

FIG. 25 shows consecutive operations of the right thinner and the top thinner with negative vertical offset with respect to the image origin while FIG. 26 shows the thinner order reversed. The results in this case are similar to those where no offset is used.

It will be realized from the foregoing that similar interactions exist between top and bottom thinners. Thus, when bottom thinning is operated on a preceding image row to top thinning, bottom thinning will always operate first, independent of the order of application. If operated on adjacent rows, top thinning of a single pel gap will occur in the thinning cycle following the one in which bottom thinning is active.

Figure 27:
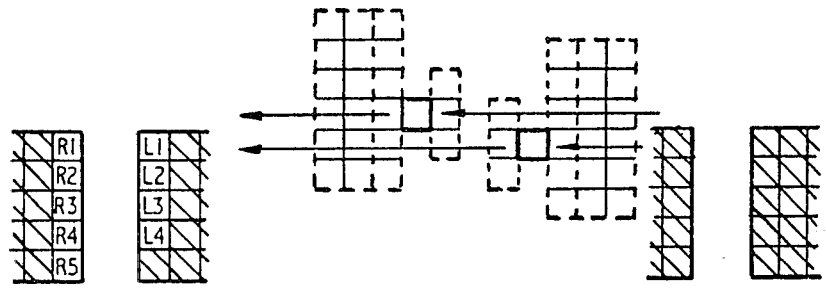
Figure 28:
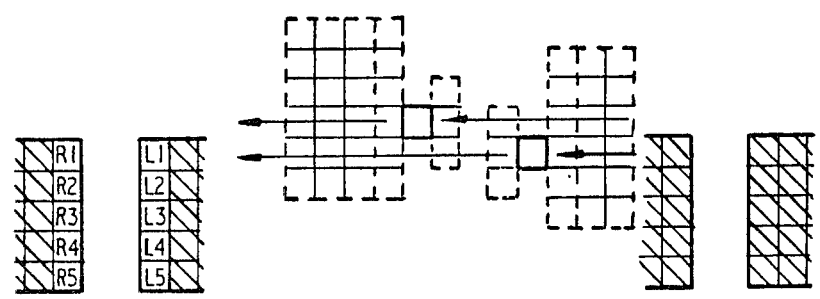

The line by line progression of thinning which occurs in the sequential operation of the selective thinner, linked with the ability of the left and right thinners to delete pels sequentially on both sides of a gap can generate asymmetrical conditions. When using vertical overlays of horizontal thinning windows which have the same dimensions, the stimulus for right thin of a gap left edge is generated from the gap right edge. In this instance for a thin right followed by thin left sequence, as shown in FIG. 27, the last pel on the gap right edge is always retained. This occurs because of the eventual removal of the left thinning stimulus by the preceding right thinning operation. This condition is cured by extending the left thinner window so that the stimulus inputs to left thinning are accepted from one column more than for right thinning. The thinning sequence of the same input data as that shown in FIG. 27 is repeated in FIG. 28, this time using a left thinner with an extended acceptance window. This condition does not arise with vertical thinning, provided horizontal overlap of the vertical thinning windows is absent.

Minimizing the window sizes is important for cost economy. In addition, window dimensions are governed by a number of other considerations. An objective of the design is to inhibit merges on all possible axes within the image. The axes on which the thinners operate are the horizontal, vertical, the diagonals and many subdiagonals, as described previously. To provide multidimensional thinning, the selected thinning windows are mostly symmetrical with respect to their main direction of thinning. As has already been mentioned, it is possible to design the selective thinner to thin from proximity data spaced at any distance from the pel under evaluation. If the thinning distance exceeds that necessary to eliminate merging, then unnecessarily low localized spatial frequencies are introduced. Over correction in this way reduces the opportunities for merge elimination on other adjacent transitions. Progression is provided within the thinning sequence to enable a minimum of 2-pels to be removed from all but top edges, assuming that proximity data provides a suitable stimulus and that surplus pels are available for removal. Inadequate thinning is augmented by the subsequent merge correction states (to be described later), however thinning is preferable to merge correction as it normally results in less distortion of the projected result.

The repeating 2-pel, 3-pel projection window structure for 240 to 96 pel translation requires a 4-pel minimum gap between adjacent data to guarantee gap retention after projection. For some data to projection window phase relationships, a 2-pel or 3-pel gap is adequate. Increasing a gap to greater than 4-pels can result in line spacing after projection which unnecessarily exceeds the minimum requirements.

Figure 29:
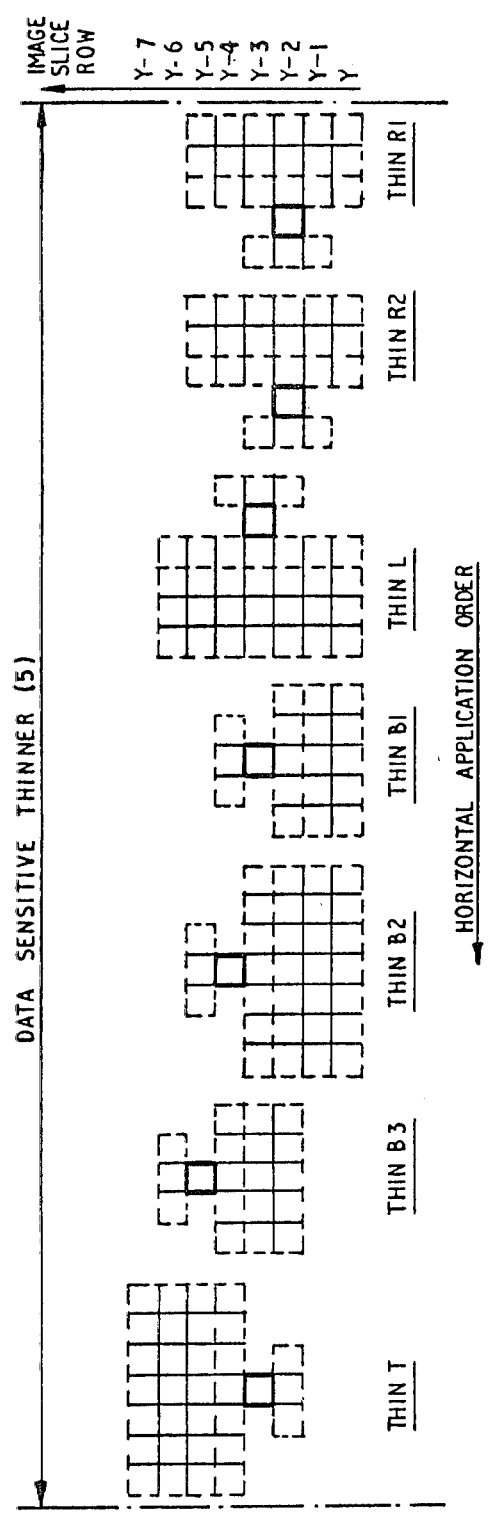
FIGS. 29 and 30 show the data sensitive thinner in schematic form.
Figure 30:
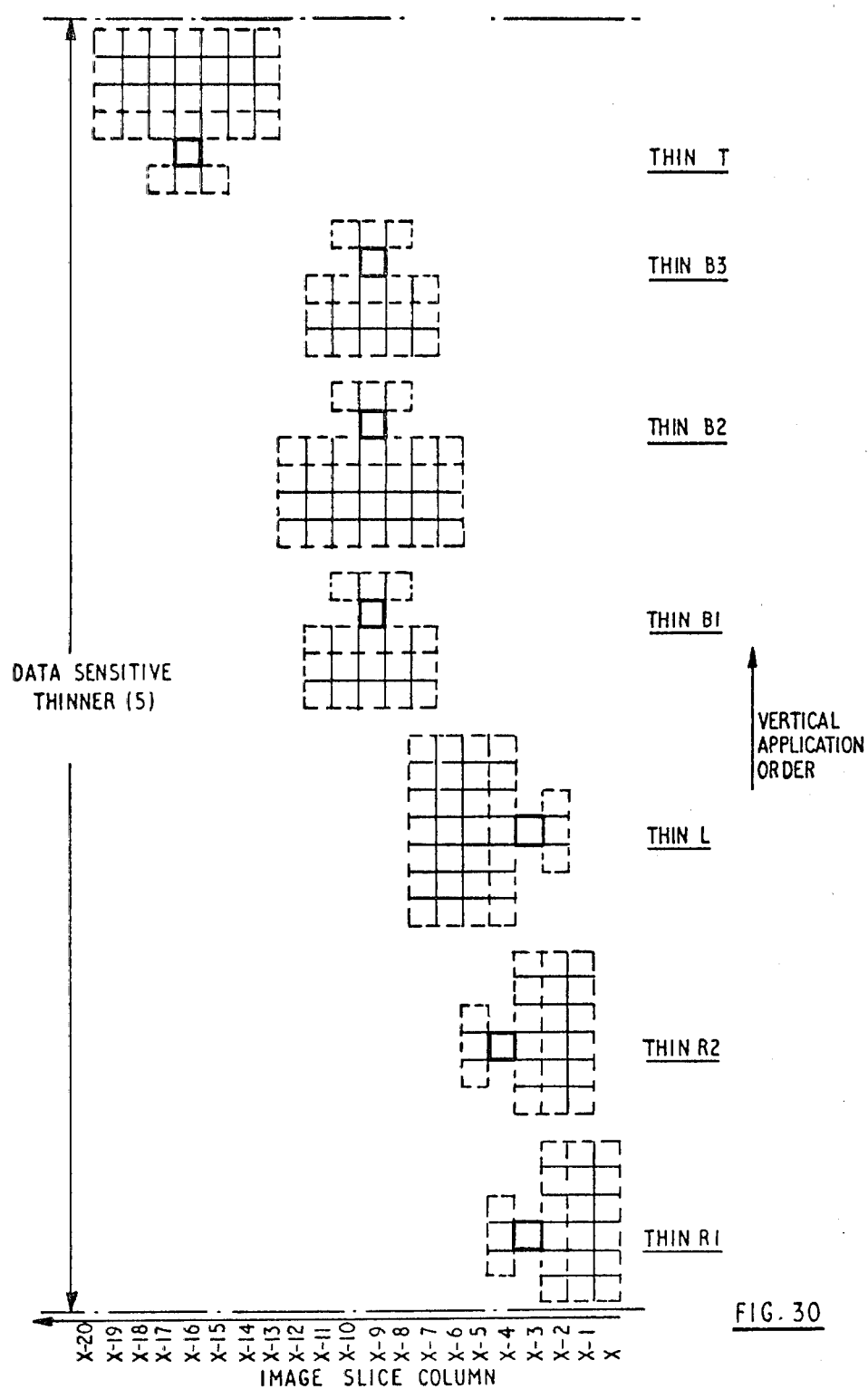

The data sensitive thinner 5 (FIG. 1) is shown schematically in FIGS. 29 and 30. The thinning operations performed on the input image data are: two thin from the right operations, one thin from the left operation, three thin from below operations and one thin from above operation in that order. The relative positions of the individual thinning windows and their dimensions have been chosen to provide adequate thinning on all the selected thinning axes, diagonals and subdiagonals. Merge correction, which results from incomplete thinning wastes space and causes unnecessary distortion of the resulting image. For this reason the thinner sequence provides a thinning capability which will normally eliminate the need for merge correction given a suitable pel structure as input.

Pel rows of input image data are numbered in ascending numerical order down the page. Thus, if row Y of image data is currently entering the bottom of the image slice, that is shift register SR1 in FIG. 2, then the immediately preceding row Y-1 will already be in shift register SR2, the second row of the slice, and so on. It is seen from FIG. 29 therefore that the selective thinner operates over eight rows of the image slice and that all seven thin operations are performed on rows Y-2 to Y-5 of the slice.

Similarly, pel columns are numbered in ascending numerical order from left to right across the image page, so that if pel X is currently entering the bottom of the image slice, then the pel immediately preceding it on the page will be pel-1 and will already be in the slice at the next pel position in that row. It is seen from FIG. 30 therefore that the selective thinner requires twenty horizontal bits or pels of the input slice in order to operate and that all seven thin operations are performed on columns X-2 to X-16 of the slice. The criteria for the selection of the thinning windows and their positions as shown in FIGS. 29 and 30 is as follows:

(1) two right thin operations and one left thin operation will usually ensure that all vertical gaps are expanded to 4-pels.
(2) the right thin operation precedes the left thin operation by one image slice row to prevent deletion of 2-pel vertical lines.
(3) the right thinners are asymmetric about the horizontal thinning axis to limit the vertical dimension of the image slice and save cost.
(4) the left thinner is wider than the right thinners to prevent single pel adhesion to the right edges of processed narrow vertical gaps.
(5) three bottom thin operations and one top thin operation will usually ensure that all horizontal gaps are expanded to 4-pels.
(6) the configuration of the bottom thin windows B1 and B2 provide a progression from a previous right thin operation so that a 3-pel vertical gap will be generated from a single pel vertical gap incision by a right thinner, and the configuration of the thin windows B2 and B3 provide a similar progression from a left thin operation which generated a 3-pel vertical gap from a single pel vertical gap incision by a left thinner.

The circuits of the data sensitive thinner for performing the selective thin operation on image data employ conventional logic. Their function is to test the state of selected shift register stages containing the image slice to determine whether window conditions for pel deletion are met and if so, for deletion of the pel. Since the image data is continuously clocked through the shift registers, the tests on the data are performed every pel time. Description of the circuitry of the complete data sensitive thinner would be a laborious and pointless task since each of the seven component thinners is essentiall the same as all the others. Accordingly, only the circuitry of the right thinner R1 will be described in detail from which the structure of the other thinners will be quite apparent.

Figure 31:
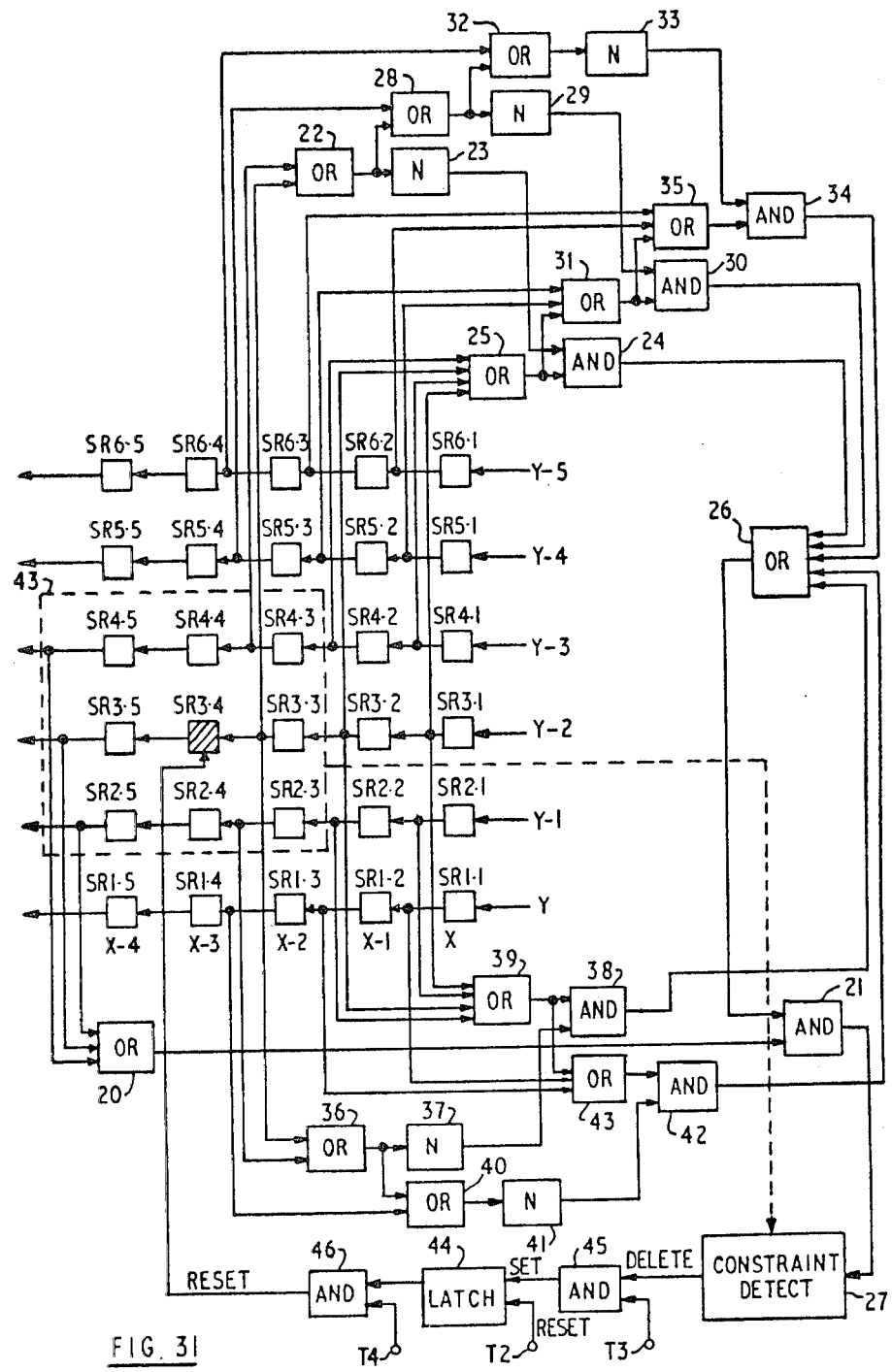
FIG. 31 shows circuit details of a right thinner forming part of the data sensitive thinner.

The right thinner R1 is shown in FIG. 31. The wndows for the thinner occupy the first five adjacent stages of the first six rows of shift registers SR1 to SR6 shown in FIG. 2. For convenience, the individual stages of the shift registers are numbered from right to left according to row and column position. Thus, the extreme right-hand stage of shift register SR1 is labelled SR1.1, the next to the left SR1.2 and the next SR1.3. The right-hand stage of shift register SR2 is labelled SR2.1, the next to the left SR2.2 and so on. Using this rotation, stage SR3.4 always contains the pel under investigation by the right thinner R1.

Circuit details of the thinner and its operation will be given with reference to FIG. 13 which shows the five separate window conditions for the right thinner. All five windows require that a right-hand edge condition be detected. This condition requires a black pel in at least one of the three adjacent pel positions in the column to the left of the pel under investigation. These pels are contained in shift register stages SR2.5, SR3.5 and SR4.5, the outputs of which are connected as inputs to OR-gate 20. An output signal from OR-gate 20 representing that the edge condition has been detected is supplied as one input to AND-gate 21.

The first window shown in FIG. 13a requires that both pels contained in stages SR3.3 and SR4.3 are zero representing a two pel vertical gap to the right of the pel being investigated. Accordingly, these stages are connected as inputs to OR-gate 22 which produces no output only when this gap condition is met. The output from OR-gate 22 is supplied as input to inverter 23 which produces a signal at its output when the gap is detected. The output from inverter 23 is supplied to one input of AND-gate 24. A further condition of the window shown in FIG. 13a is that a black pel providing the stimulus for deletion exists in at least one of the four adjacent pel positions to the right of the gap contained in shift register stages SR3.1, SR3.2, SR4.1 and SR4.2. Accordingly, these stages are connected as inputs to OR-gate 25. An output signal from OR-gate 25 indicates that a deletion stimulus is present and is gated through AND-gate 24, provided the gap condition is detected by OR-gate 22. A signal from AND-gate 24 is applied via OR-gate 26 as one input to AND-gate 21 through which it is gated, provided the right-edge condition is detected by OR-gate 20. And output from AND-gate 21 indicates that the window conditions shown in FIG. 13a have been satisfied and, assuming no connectivity or other constraint is detected by constraint logic 27, the pel under investigation is deleted by resetting shift register stage SR3.4.

Simultaneously, the image data is tested against the conditions of the window shown in FIG. 13b. This window requires the gap to be extended vertically by one pel and the stimulus for deletion to be accepted from either of two further adjacent pel position in shift register stages SR5.1 and SR5.2. Accordingly, the output of gap detect OR-gate 22 is further connected to one input of OR-gate 28. The other input is supplied from the output of shift register stage SR5.3. No output from OR-gate 28 indicates that the extended gap condition is satisfied. As before, the output of the OR-gate 28 is inverted by inverter 29 and supplied as one input to AND-gate 30. Additionally, the output from OR-gate 25 is further applied as one input to OR-gate 31. Two further inputs to OR-gate 31 are supplied from shift register stages SR5.1 and SR5.2. An output from OR-gate 31 supplied to a second input of AND-gate 30 indicates that a stimulus for deletion has been detected. Provided that the extended gap condition is also satisfied, a signal is passed from AND-gate 30 via OR-gate 26 to AND-gate 21 as before. The pel in SR3.4 will be deleted provided the edge condition tested by OR-gate 20 is satisfied.

The window shown in FIG. 13c extends the gap by one more pel and accepts stimuli for deletion from two further pels in shift register stages SR6.1 and SR6.2. Thus the output of OR-gate 28 is supplied as one input to OR-gate 32 which also has an input supplied from shift register stage SR6.3. The output of OR-gate 32 is inverted by inverter 33 and applied as one input to AND-gate 34. Additionally, the output from OR-gate 31 is applied as one input to OR-gate 35 which has two further inputs supplied from shift register stages SR6.1 and SR6.2. The output of OR-gate 35 is connected as a second input to AND-gate 34. The output from AND-gate 34 is passed via OR-gate 26 to AND-gate 21 and indicates that the gap and stimuli conditions of the window shown in FIG. 13c are satisfied. Coincident detection of a right-hand edge by OR-gate 20 causes deletion of the pel in shift register stage SR3.4.

The conditions of the windows shown in FIG. 13d and FIG. 13e are simultaneously tested using identical logic. Thus for the window in FIG. 13d, shift register stages SR3.3 and SR2.3 are connected as inputs to OR-gate 36. The output of OR-gate 36 is inverted by Inverter 37 and supplied as one input to AND-gate 38. Shift register stages SR3.1, SR3.2, SR2.1 and SR2.2 are connected to OR-gate 39, the output of which is supplied as a second input to AND-gate 38. An output from AND-gate 38, indicating that the gap and stimuli conditions of the window shown in FIG. 13d are satisfied, is gated through OR-gate 26 to AND-gate 21.

To test the conditions of the window in FIG. 13e, the output of OR-gate 36 is further connected as input to OR-gate 40, which receives a second input from shift register stage SR1.3. The output of OR-gate 40 is inverted by Inverter 41 and supplied as one input to AND-gate 42. Additionally, the output from OR-gate 39 is applied as one input to OR-gate 43 which receives two further inputs from shift register stages SR1.1 and SR1.2. The output from OR-gate 43 is supplied as a second input to AND-gate 42, an output from which, indicating that the gap and stimuli conditions of the window shown in FIG. 13e are satisfied, is gated through OR-gate 26 to AND-gate 21.

Test for connectivity, corner and T-junction constraints are performed within a 3×3 matrix of pels having the pel being investigated at its center. In FIG. 31 the matrix is shown enclosed by a dotted outline 43. The constraint tests, which are applied to each of the seven individual thinners in the selective thinner, have been fully discussed with reference to FIGS. 14, 15 and 16 which disclose the various logical operations required. Further, the same connectivity and T-junctions constraints and a similar corner constraint are disclosed in the aforementioned U.S. Pat. No. 1,517,869. Accordingly, since the logic circuits required will be immediately apparent to one skilled in the art, they are not individually shown on the already detailed circuit diagram of FIG. 31, but are represented by a single block 27 with a dotted line connection from the constraint matrix 43. As explained previously, detection of any one of the various constraints associated with an investigated pel marked for deletion inhibits deletion of the pel.

Figure 32:
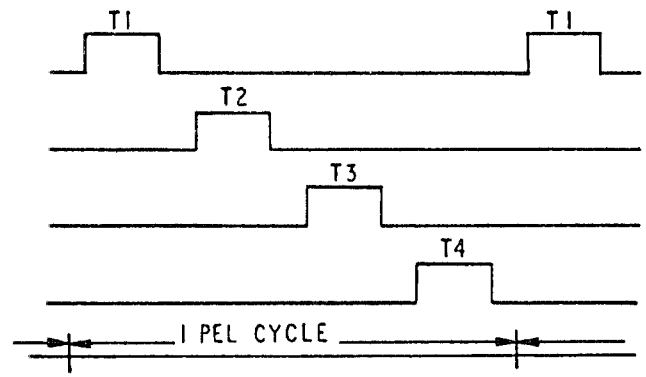
FIG. 32 shows a timing diagram for operation of the circuits shown in FIG. 31.

In describing the circuits for deleting a pel under investigation, it is appropriate to refer briefly to the timing control of the selective thinner. FIG. 32 shows a simple timing diagram from which it is seen that four timing pulses T1, T2, T3 and T4 are generated each pel cycle time. Pulse T1 generated at the start of each pel time is used to clock the image data through the bank of shift registers and to reset a latch 44, the output from which is used to delete a pel under investigation. A delete signal from the constraint detect block 27 requiring such pel deletion is applied to one input of AND-gate 45 and gated through to the set terminal of latch 44 on occurrence of the T2 timing pulse. The output from the now SET latch 44 is gated through AND-gate 46 on occurrence of the T4 timing pulse to reset the shift register stage SR3.4 containing the pel under investigation. The image data is clocked on one pel position through the shift registers by the T1 pulse at the start of the next pel cycle, the latch 44 reset, and the process is repeated.

Figure 33:
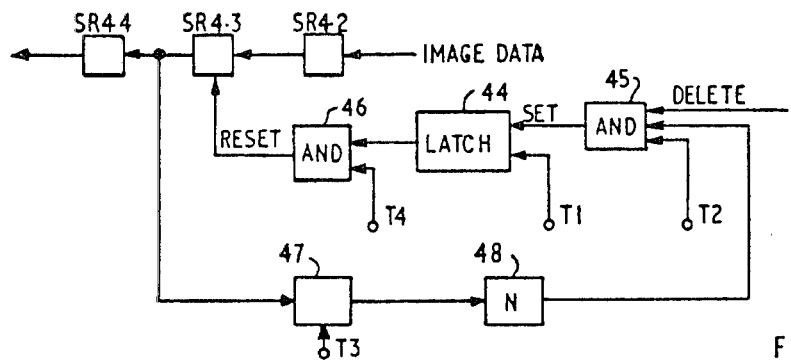
FIG. 33 shows a circuit for inhibiting progressive left thinning.

The left thinner includes additional circuits to prevent the problem of progressive thinning as described previously with reference to FIG. 17. Shift register stage SR4.3 contains the pel under investigation by the left thinner and this and the relevant portions of the left thinner circuits necessary to prevent progressive thinning are shown in FIG. 33. The same reference numerals are used in this figure as were used to identify corresponding circuits in FIG. 31. The object of additional circuits in FIG. 33 is to inhibit pel deletion if the pel previously investigated has already been deleted by the left thinner. Thus the state of each pel in shift register SR4.3 is read into two-level latch 47 at T3 time. The output of this latch represents the state of the pel currently being investigated and remembers this state after the pel has been deleted at T4 time. The output from latch 47 is inverted by Inverter 48 and applied as a third input to AND-gate 45. It is seen therefore that if the previous pel was a black pel which was deleted, the output from latch 47 at T2 time will be 'up' and the output from Inverter 48 will be 'down' so that the current pel in shift register stage SR4.3 will not be deleted. The latch 47 remains in this set condition until the current string of black pels has passed through the shift register stage SR4.3.

Figure 34:
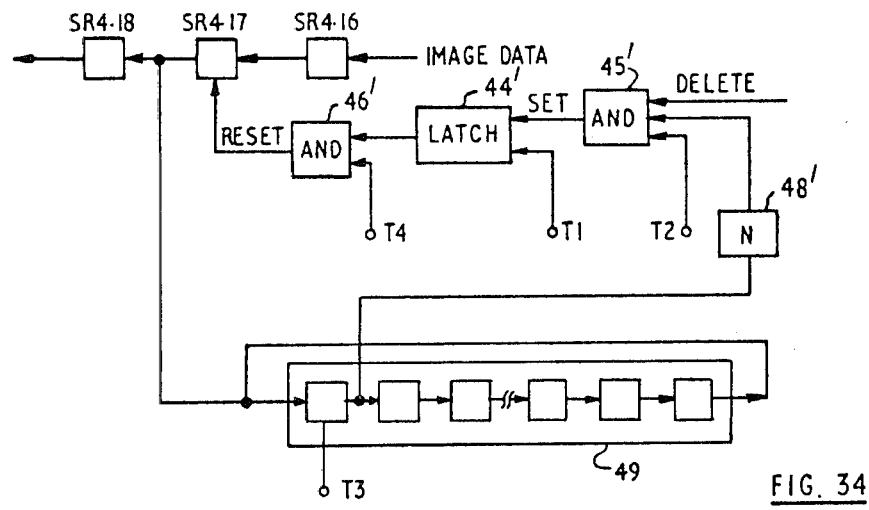
FIG. 34 shows a circuit for inhibiting progressive top thinning.

Progressive thinning can also be a problem with the top thinner as previously explained and additional circuits are required in this case also for its prevention. The shift register stage SR4.17 contains the pel under investigation by the top thinner. The relevant portions of the top thinner are shown in FIG. 34. In this case, the problem is complicated by the need to remember, when considering a pel for deletion, whether or not a pel in the corresponding position of the previous row through the shift register stage SR4.17 was deleted, in which case the current pel deletion is inhibited. To do this, a closed loop shift register 49 having as many stages as there are pels in an image row is connected to the output of shift register stage SR4.17. At time T3 the state of the pel currently under investigation is clocked into the first stage of the shift register over-writing the previous stored data. The first stage of the register 49 therefore contains the state of the pel under investigation before its deletion at time T4. The image data and the contents of shift register 49 are clocked each pel time by timing pulses T1 and a delete latch 44' is reset. The output from the first stage of shift register 49 is inverted by Inverter 48' and supplied as a third input to AND-gate 45'. It is seen therefore that at T2 time the first stage of the register 49 is storing the corresponding pel condition for the previous row. Accordingly, if this was a black pel then AND-gate 45' is not enabled and the current pel in stage SR4.17 is not deleted. In the event that the corresponding pel in the previous row was not a black pel, then AND-gate 45' is enabled, and the stage SR4.17 is deleted at T4 time via latch 44' and AND-gate 46'.

The scale change projection operation utilizes the logical OR of pels within the projection windows to determine the resultant image. This method has the advantage of preserving connectivity but the disadvantage of increasing the percentage of black pels in the result with respect to the original image.

The data sensitive thinner described above enables pels which contribute to merge states to be given deletion preference. In areas of high spacial frequency the proportion of pels removed by this method will normally ensure that the projected result contains a suitable level of percentage black for acceptable viewing. For lower spatial frequencies the selective thinner is inoperative and the projected result can contain unacceptably thick lines. To counteract this effect, two phases of nonselective thinning are used to reduce the percentage of black pels prior to projection. The nonselective thinner 6 (FIG. 1) performs two additional thin operations on the image data emerging from the data sensitive thinner 5. The operations are thin from the right and thin from below, applied in that order. The logical operator for the nonselective right thinner is shown in FIG. 35 and consists of a 4-pel window. The pel under investigation is the pel in position (Xn, Yn) and will be deleted if either of the pels in position Xn−1, Yn+1 or Xn−1, Yn are black and the pel in position Xn+1, Yn is white.

The logical operators for the nonselective bottom thinner is shown in FIG. 36 and consists of a 5-pel window. Again, the pel under investigation is the one in position (Xn, Yn). The conditions for deletion are that one of the pels in positions Xn−1, Yn+1; Xn, Yn+1; Xn+1, Yn+1 is black and the pel in position Xn, Yn−1 is white.

As with the data sensitive thinner, deletion of a pel is prevented if this would cause a discontinuity in the image. Thus, the same connectivity, T-junction and corner constraints are applied to the nonselective thinner as are applied to the data sensitive thinner. An additional constraint is applied if the pel for deletion is found to be at the end of a 1-pel thick line. This condition is tested by determining whether the pel has only one neighbor. FIGS. 37a to 37h show logical operators, using a similar rotation to FIGS. 14 and 16, for determining whether a pel is at the end of a 1-pel thick line. If it is, removal of the pel is inhibited. The same end of line constraint is disclosed in the aforementioned U.S. Pat. No. 1,517,869.

Figure 38:
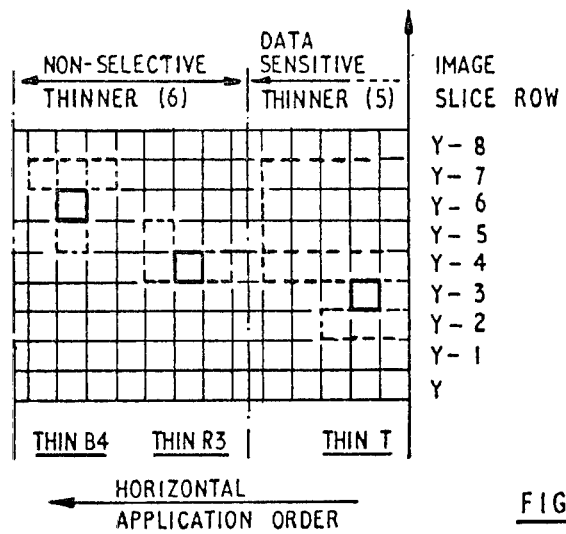
FIGS. 38 and 39 show the non-selective thinner in schematic form.
Figure 39:
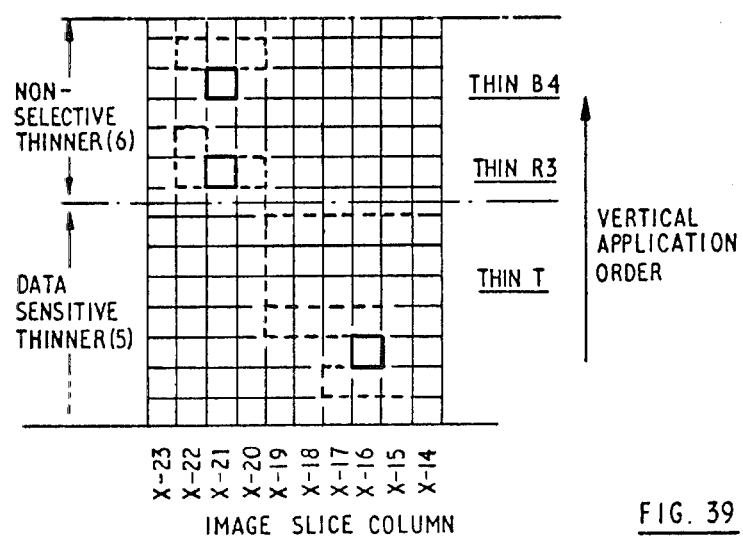

The nonselective thinner is shown schematically in FIGS. 38 and 39 as extensions of FIGS. 29 and 30 respectively. Again, the location of the two thinning windows are shown in relation to the two axes of the image slice. Thus the right thinning operation precedes the bottom thinning operation by two row positions but is operative on the same image slice column.

The data sensitive and nonselective thinning operations are followed by a data sensitive merge correction operation. The main objective of merge correction is the discrete repositioning of the remaining pels to minimize residual merge states in the image. The operation of merge correction is such that further thinning may occur where previous thinning operations have left surplus pels. FIG. 40 illustrates the operation of the data sensitive thinner and merge correction unit on sample data. An original pel input image is shown in FIG. 40a. The same data after the thinning operations have been performed before and after scale charge projection is shown in FIG. 40(b). The same data after the merge correction operations have been performed again before and after scale change projection is shown in FIG. 40c. In this example merge correction stretches the characters both upwards and downwards into the free space which exists between lines. In the horizontal direction the strokes and gaps are subject to local repositioning within the available space to avoid merges both within and between characters. Merge correction is performed about the horizontal and vertical axes. For simplicity the following description of merge correction principles are based on horizontal merge correction. Merging can occur when the interpel gaps after thinning and prior to scale change projection is two or three pels and the data phasing is unfavorable. Merging will always occur with gaps of only one pel, and accordingly merge correction is designed to correct for the two and three pel gaps, where data phasing may initiate a merge.

The projection window to data relationships for the cases where merge correction is applied are shown in FIG. 41. The projection window boundaries are shown as relatively heavy lines. In general, there are two opportunities to correct a merge, the left edge of the gap boundary can be moved further to the left or alternatively the right edge can be moved further to the right. Both options are provided by merge correction. For the two pel gap shown in FIG. 41a, the choice of moves is complicated by the asymmetry of the gap within the window boundaries in that the primary correction option requires only a single position pel movement, but the secondary option requires movement of a pel by two positions. For 3-pel gaps as shown in FIG. 40b, this primary/secondary choice does not exist because correction can be achieved by a single position movement of either pel.

In general, the movements made are not simply determined by the choice of primary or secondary corrections, but by examination of data in the proximity of the proposed move. Where correction of a merge would introduce an alternative merge, the pel movement is normally inhibited. The operation of merge correction is a function of the data surrounding the merge and the progression by which merges are detected and corrected. Accept conditions are generated for both primary and secondary correction. Although the injudicious use of secondary correction cannot directly alter pel structure of the projected result, it can limit alternative correction options. For this reason, when primary correction will not subsequently occur as the result of the secondary correction, the secondary move is inhibited.

The correction stimulus conditions for merge correction are similar to those used for selective thinning apart from the addition of projection window boundary gating. This gating introduces row and column selection of the pels which contribute to the correction stimulus. The rows and columns selected are those which are in the projection windows which are adjacent on the correction axis or diagonals to the one containing the pel under consideration.

Figure 42:
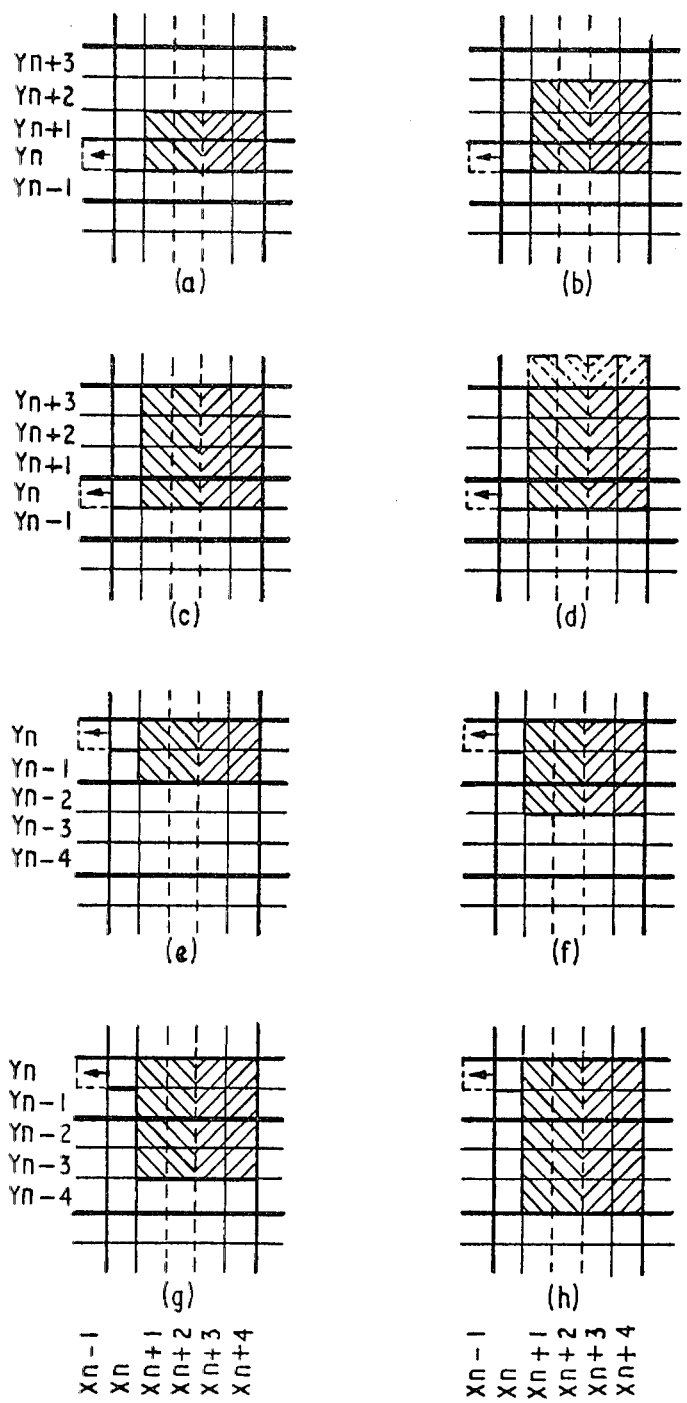
FIGS. 42a–42h show some correction stimuli windows for merge correction.

FIG. 42 illustrates the correction stimuli for the two possible horizontal projection window alignments for the pel (Xn,Yn) under consideration for a primary move across the window boundary between column Xn and Xn−1. The two alternative positions of the window boundaries depending on whether the pel XnYn is in a 2-pel or 3-pel wide window are shown as heavy dotted lines. As with the thinning windows, the stimuli for a primary pel move are taken from pels in horizontal, diagonal and subdiagonal positions in the adjacent horizontal and two diagonal window positions. The window conditions for a primary move require that all pels in locations where the cross-hatching is downward from left to right should be ZERO, that is, a 2-pel wide gap must always be present between the pel to be moved and its stimulus. Further, the logical OR of the pels in locations where cross-hatching is upward from left to right should be ONE. The minimum 2-pel gap is required when the pel to be moved is contained in a 2-pel or a 3-pel wide window.

FIG. 42 shows all eight possible window configurations of acceptable stimuli for horizontal primary movement of a pel. The window configuration (d) is not used with the pel in the position XnYn shown because of the window boundary phasing. Clearly, this configuration is required for a pel in position (Xn,Xn−1) but in this case configuration (h) is redundant.

FIG. 43 shows the window outlines for stimulating horizontal primary moves to the left of pels in the five possible pel positions adjacent a vertical boundary. Thus, the window condition (a) is the sum of the eight windows shown in FIG. 42. In each case, the dotted cross-hatching shows those portions of the window outlines excluded by the window gating. The gating circuits and their operation will be described later.

Figure 44:
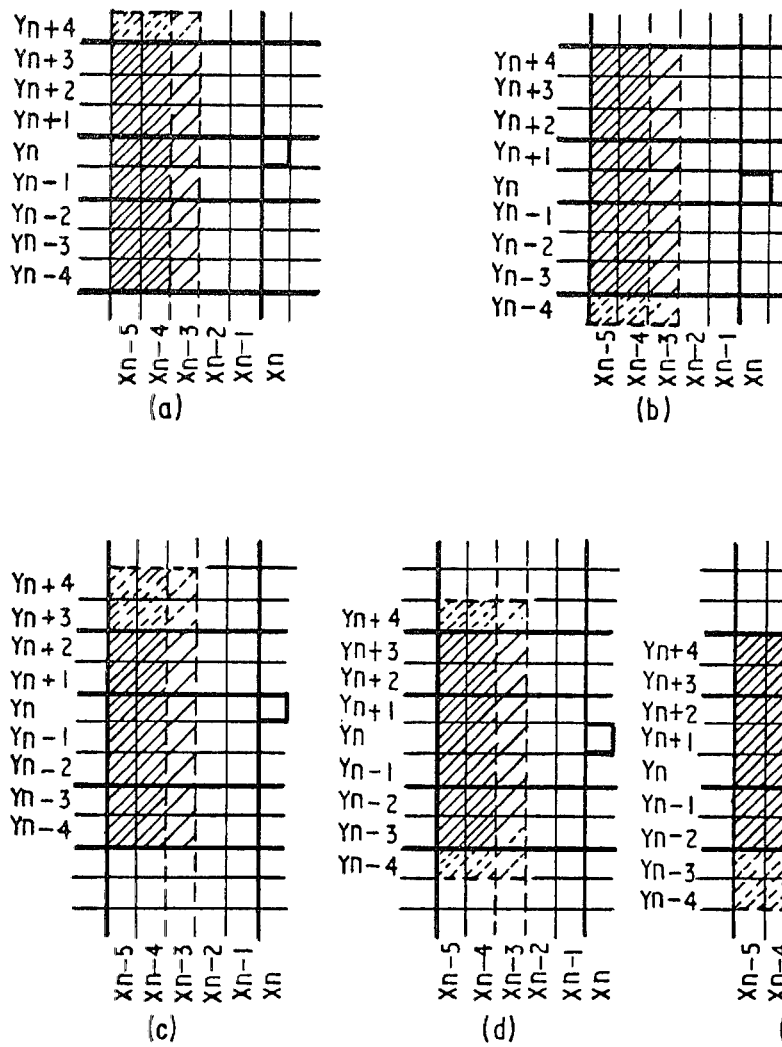
FIGS. 44a–44e show window conditions for detecting alternative merge states as a result of primary correction.

The acceptance conditions generated for merge correction can either prevent alternative merges occurring or, as will be shown later, allow them under controlled conditions. The window conditions for detecting alternative merge states resulting from pel movement are shown in FIG. 44. A ONE in any of the pel positions in the three projection windows (one horizontal and two diagonal) adjacent the window into which it is proposed to move the pel under consideration, is used to inhibit the pel movement. The five window conditions (a) to (e) shown in FIG. 44 are the pel move inhibit conditions associated with the stimuli conditions (a) to (e) for correspondingly positioned pels in FIG. 43. The alternative position of the 2-pel and 3-pel boundaries are shown as before as heavy dotted lines. The interleaved cross-hatching shows the extent of the inhibit conditions for the two alternative boundary conditions. Selection of the appropriate pels to test these conditions is controlled by boundary gating circuits to be described later.

Each pel under consideration is further tested to determine whether or not merge conditions would be improved by OR-ing it with an existing ON pel in an adjacent position on the other side of a window boundary. Only three pels are considered as shown in the window configuration of FIG. 45. The window conditions require that a pel in position (XnYn) be moved across the adjacent boundary, provided a stimulus for movement is present, if the pel in position (Xn, Yn+1) is ZERO and either of the two adjacent pels (Xn−1, Yn) or (Xn−1, Yn+1) across the boundary are ONE. The existence of an adjacent ON-pel on the thinning axis indicates the acceptability of further thinning by 'OR'-ing the pels without alternative merge generation. The existence of the diagonally adjacent pel in the previous row is used to indicate the acceptability of further 'OR'-ing. Examination of these pels, while excluding consideration of the projection structure perpendicular to the correction axis, provides the basis for a practical system. The function tends to preserve the entity structure even when the entities are individually illegible and thus it also localizes degradation. It does not guard against alternative merge states but the characteristics of the merge correction connectivity logic when used in combination with this 'OR'-ing condition tends to control the type of merges which occur. The result is that merges mostly occur within a character or object and the separation of the characters or objects is preserved.

Figure 45:
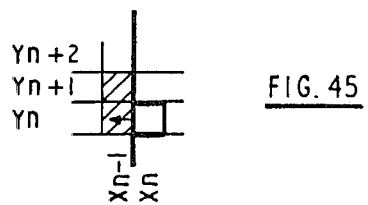
FIG. 45 shows a further window configuration used for merge correction.

The window shown in FIG. 45 effectively provides additional thinning or surplus pels which otherwise would be a direct cause of merging. Insufficient thinning by previous operations may result when the input strokes to the thinners are not of adequate and even thickness and are spaced by only 1-pel. The previous thinner stages do not always remove an adequate number of pels to prevent merging after projection. Further, the pel removal criteria used by the thinners are independent of the relationship between the image data and the projection window structure which overlaps it. It is therefore quite usual to encounter thinned lines which unnecessarily straddle projection boundaries. These lines can contain redundant pels which when projected result in double pel strokes at the target resolution. The move conditions detected by the window shown in FIG. 45 override any move inhibit conditions which may already exist.

Merge correction is inhibited where it would introduce a change in the connectivity of the image line structure. The connection structure is measured, as described previously with respect to selective thinning, by examination of the contents of 3×3 windows surrounding the pel under consideration. Two simple tests are performed on the image data in order to prevent discontinuities being formed by merge correction.

Figure 46:
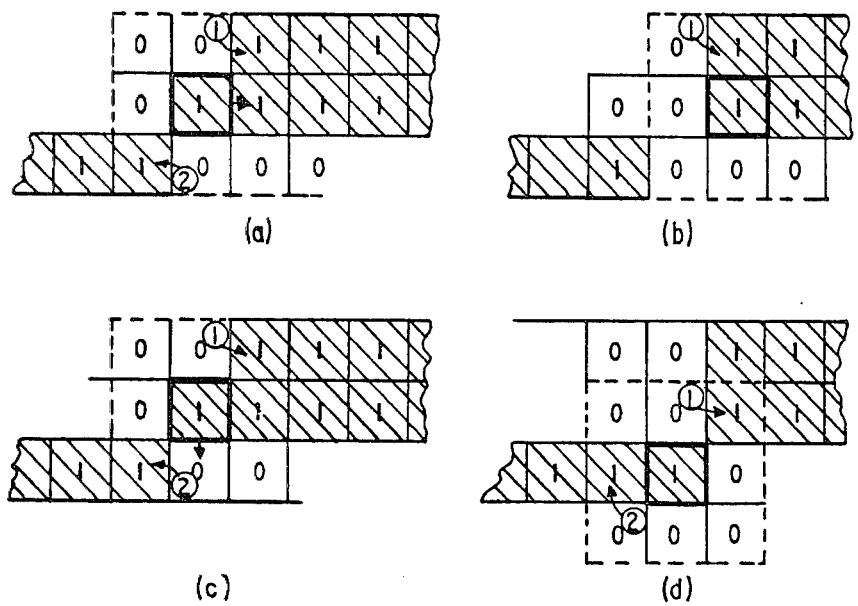
FIGS. 46a–46d show window condition for testing connectivity during merge correction.

The first test involves testing the contents of the 3×3 windows surrounding both the existing and proposed pel positions. If it is found that the move results in less connections than before, it is inhibited. The test is explained with reference to FIG. 46. In FIG. 46(a) the pel under investigation is the center pel of the 3×3 matrix of pels shown in dotted outline and forms a link between two horizontal black features. In this case, the proposed move is to the right as indicated by the arrow associated with the pel. Applying the previously described connectivity test to this pel shows that it performs two connection functions with its neighbors. FIG. (46a) shows the situation after the move with a clear discontinuity formed. The connectivity test applied to the new pel position now shows that only one connection function is performed and the pel is reset in its original position.

FIG. (46c) shows the same image data but with proposed move downwards into the position shown in FIG. (46d). In this case connectivity is not broken, the connectivity test produces the same count of connection functions both before and after the move and accordingly the move is permitted. It will be observed that although each individual test is performed on a 3×3 matrix, it must be repeated each time with the pel in its new position. Accordingly, the actual window size required by each merge correct unit (that is, correct to the right, left, down or up) in order to accommodate the two overlaid windows is a 3×4 matrix.

This test can fail under certain circumstances. For example, inspection of the image data in FIG. (47a) shows that there are two connection functions performed by the pel under investigation. The situation after a downward merge correction move is shown in FIG. (47b) from which it is seen that the pel still performs two connection functions. Thus it meets the conditions of the first test which would not prevent the move and yet a clear discontinuity has resulted.

The second test to detect this type of situation is performed by inspecting the surrounding pels for a further set of window conditions. These conditions to inhibit a vertical pel movement are shown in FIG. 48. Thus, the central pel will not be moved if any one of the three pels in row $Yn+1$ is a ONE, and any one of the three pels in row $Yn-1$ is also a ONE, and the two adjacent pels in row Yn are both ZERO. Under these circumstances, the proposed pel movement in FIG. 47 would be inhibited.

This completes the description of the function of a merge correction unit for a primary pel movement. There are, as will have been appreciated, four such units, one for each of the four possible directions of merge correction. Each unit has indicated stimuli windows and inhibit constraints as described with reference to the left move merge correction unit described in detail above. Thus, apart from being rotated with respect to the image slice, to operate in the required direction, they are all identical to each other.

Figure 49:
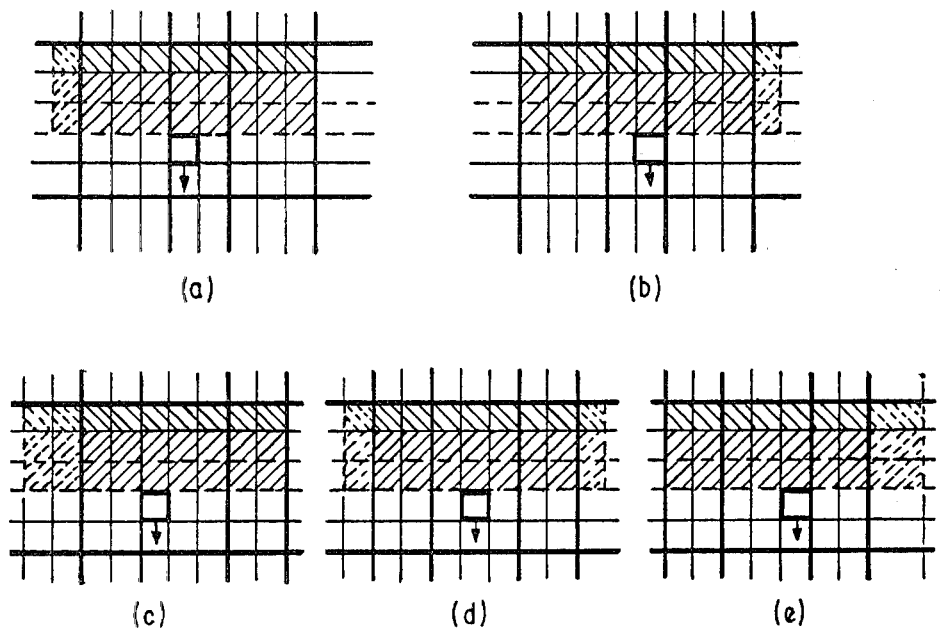
FIGS. 49a–49e show the stimuli conditions for downward secondary merge correction.
Figure 50:
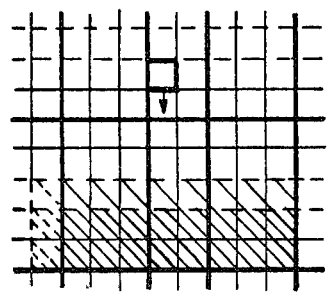
FIG. 50 shows the window conditions for detecting alternative merge states as a result of secondary correction.

In addition to the four merge correction units for primary pel movement, there are two merge correction units for secondary pel movement. These operate in downward and rightward directions respectively. The stimuli conditions for a downward secondary pel movement are shown in FIG. 49. The pels are shown in the five possible positions (a) to (e) spaced one pel gap from a horizontal boundary. It will be understood that each of the window outlines (a) to (e) are formed from a number of sub-windows as for the primary windows used to detect stimuli conditions from axial, diagonal and subdiagonal pels. The dotted cross-hatching shows those portions of the window outlines made redundant by the phasing of the vertical windows. The acceptance condition for secondary merge correction of a pel is as shown in FIG. 50. The accept conditions are those for a pel in the position shown in FIG. 49(a) from which all remaining accept windows will be obvious. It is seen that the requirement for a three pel gap between the pel to be moved and the next black feature ensures that a secondary move cannot take place unless the subsequent primary move across the boundary is also permitted. Pels selected for secondary movement are subjected to the same inhibits and constraints as are pels selected for primary movement.

Figure 51B:
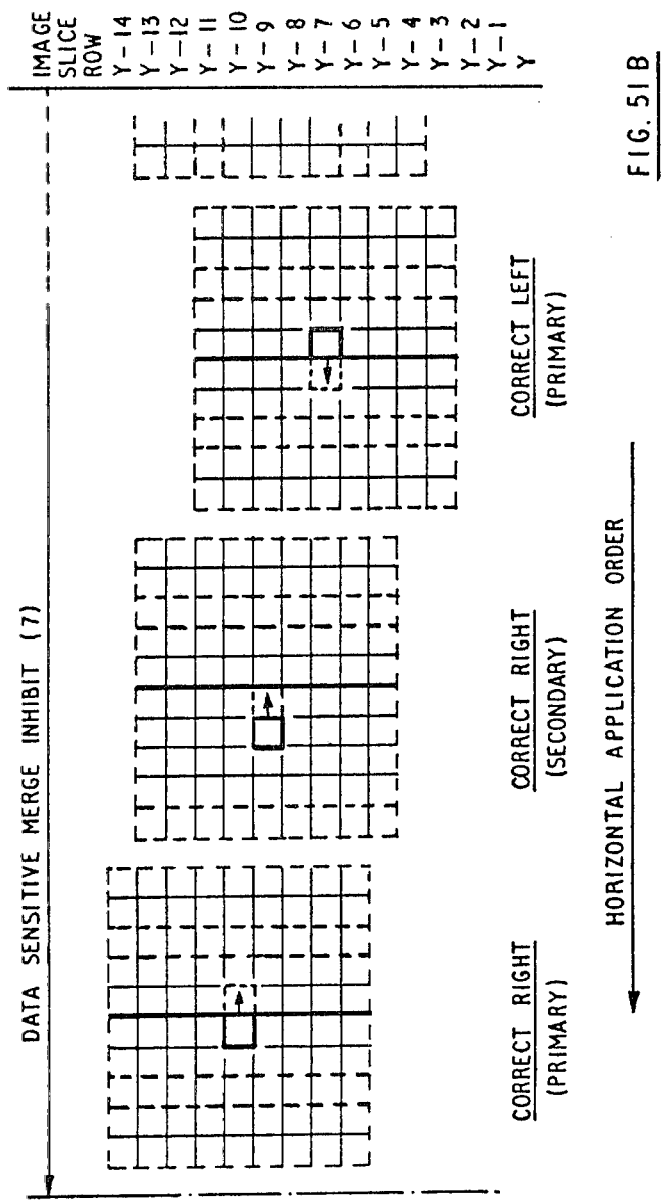
Figure 52A:
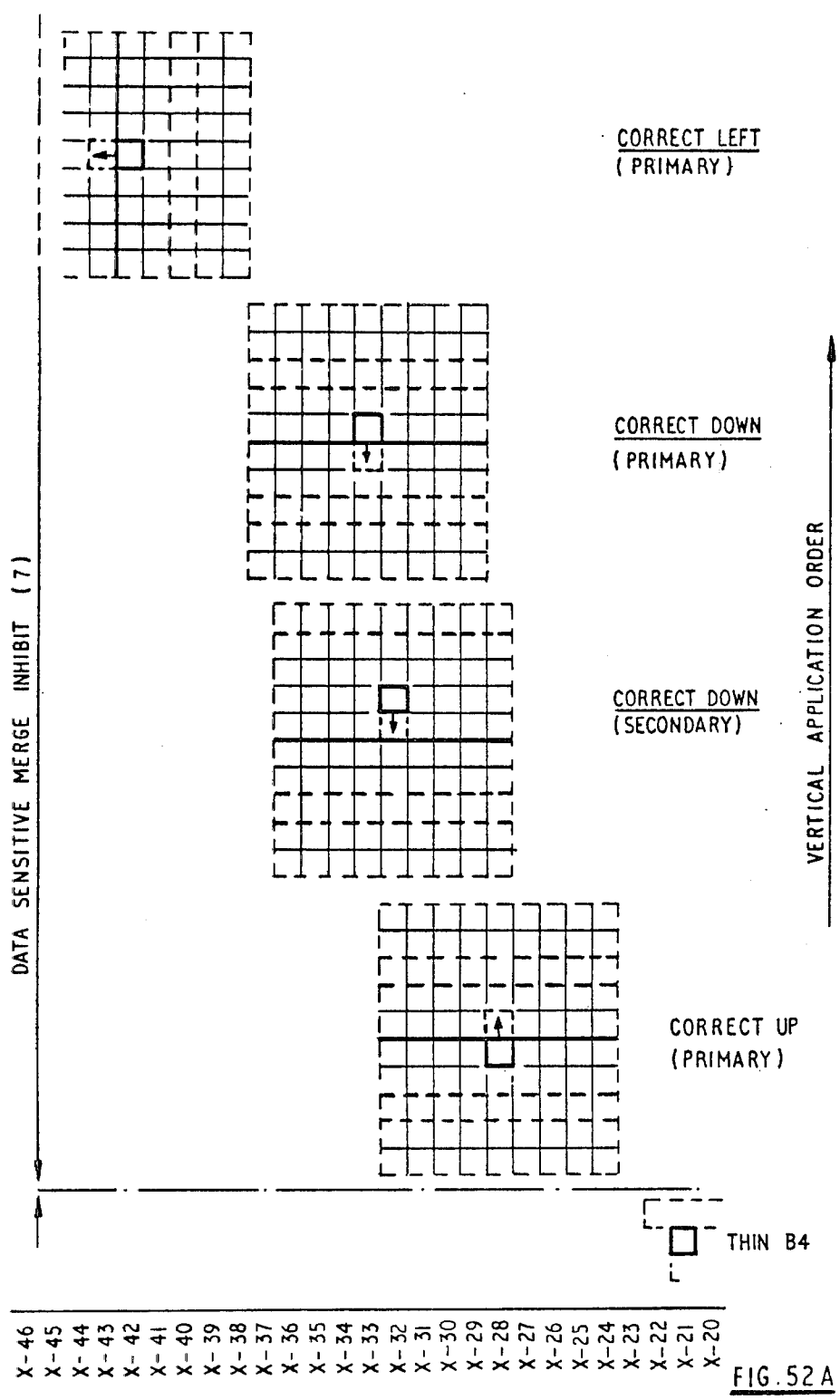
Figure 52B:
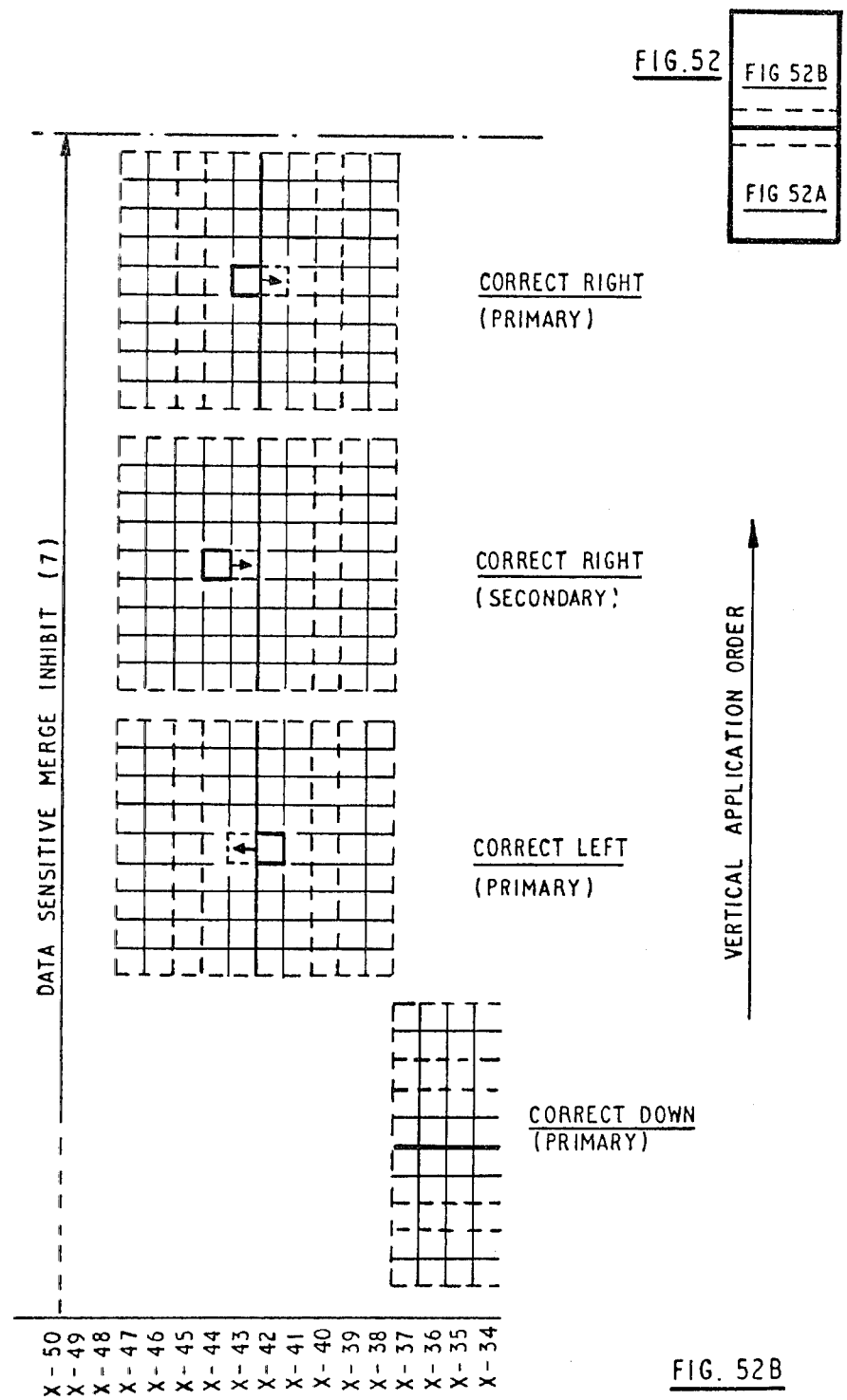

The data sensitive merge inhibit unit (7) is shown schematically in FIGS. 51 and 52 as extensions of FIGS. 29 and 30 respectively. The number and size of the windows of the merge inhibit unit (7) are such that it is move convenient to show FIG. 51 split into two separate overlapping figures, labelled FIG. 51A and FIG. 51B respectively, and FIG. 52 into two separate overlapping figures labelled FIG. 52A and FIG. 52B respectively. As before, the locations of the various merge correction windows, which together form the complete merge inhibit unit (7), are shown in relation to the two axes of the image slice. The merge correction operations performed by the merge inhibit unit (7) are: primary correct upwards, secondary correct downwards, primary correct downwards, secondary correct downwards, primary correct downwards, primary correct leftwards, secondary correct rightwards and primary correct rightwards. These correction moves aimed at preventing data merging on projection are applied in the order given above and shown in the two figures.

From this it will be seen that, as the image data passes through the unit (7), merge correction is effectively applied progressively line by line from the top of the image and within each line from left to right. The unit operates incrementally and each pel move is used as an input condition for the next prospective movement. Thus the area of the image which has been fully thinned and merge corrected lies above or to the left of the current position of the merge correction windows with respect to thinning data. The first correction operation on each axis attempts to utilize space in the already corrected parts of the image. Thus the first correction operation on the horizontal and vertical axes are left and up respectively. Merge correction as implemented is asymmetrical in that secondary correction always attempts to resolve merges in areas of the image not yet subjected to correction. The purpose of secondary correction is, it will be recalled, to move a pel having a suitable stimulus into a position from where it can subsequently be moved across a boundary by a primary correction operation.

The sequence of vertical followed by horizontal correction allows the results of vertical correction to be used as input to those horizontal correction moves which can be performed in the current or a subsequent image slice. As shown in FIG. 51 and 52, all primary correction options have been implemented. Secondary correction is applied one row ahead of horizontal primary correction and one column ahead vertical primary correction so that identified pels are positioned by secondary correction for merge elimination by the primary correction. Although two secondary correction options exist on each axis, only one is utilized in each case, namely, secondary correct downwards and secondary correct rightwards. The selected secondary correction moves are related to the method of correction and move pels towards the region of the image as yet uncorrected.

A minimum vertical dimension for the scale charge module is desirable in order to reduce cost. Window overlap can result in the incomplete operation of one window generating false conditions for a subsequent function. For example, an overlap of opposing correction windows could result in two correction operations occurring where, with an adequate operating delay, one operation would suffice. Complete window separation is therefore desirable. The horizontal separation of the up and down page correction windows has a small cost impact. However, vertical separation of the horizontal correction windows is more costly and, accordingly, some economies have been made in this design in the window dimensions. Progression in the correction sequence is desirable when it allows an edge pel which has been revealed by one correction stage to be corrected by a later stage. The present vertical correction window alignment precludes the upward correction of a pel revealed by a right correction and the leftward correction of a pel revealed by a downward correction. Incomplete thinning can generate transient gaps which merge correction will attempt to resolve. Adequate vertical spacing between the thinners and merge correction together with reduced correction window dimensions are the practical solution to this problem. Accordingly, all thinning on rows included within the vertical merge correction window is completed prior to vertical merge correction.

Vertical merge correction introduces a progressive down page correction possibility which is inhibited in the implementation described. Iterative merge correction arises where the correction sequence brings the moved pel into 'range' for a second correction from its modified position. Iterative correction is prevented by remembering down page primary correction operations in a correction inhibit register (to be described later), the contents of which inhibits down page secondary correction in column positions where it is set to ONE representing the previous primary correction.

It is seen from FIG. 51 that the merge inhibit unit (7) requires fourteen horizontal bits or pels of the input slice in order to operate. All six merge inhibit operations are performed over twelve rows of the image slice although the actual pel movements are confined to rows X-7 to X-10 of the slice. Thus the entire consolidation unit operates on an image slice fourteen rows deep with each row having forty-six pels or bits.

The circuits of the data sensitive merge inhibit unit employ simple logic. Much of the logic is repetitive and, as with thinners, description of the complete unit is unnecessary. Accordingly, circuitry of the primary correct downward merge correction unit will be described in sufficient detail for its construction and operation to be understood from which the structure of the entire merge inhibit unit (7) will be quite apparent.

The correct down primary window circuits are shown in FIG. 53. As before in the description of the selective thinners, the shift register stages included in the window structures are numbered from right to left according to row and column position. Reference to FIGS. 51 and 52 shows that the pel under investigation for merge correction movement is the pel occupying shift register stage SR10.34 in shift register row Y-9 and column X-33. During the following description of the merge inhibit unit, reference should be made to FIG. 43 which shows the various window outlines for stimulating primary pel movement and FIG. 44 which shows the conditions which detect alternative merge states and inhibit pel movement.

Although scale-change projection of the image slice does not occur until after the completion of thinning and merge correction, the positions of the scale change window boundaries with respect to image data must be known in order to select the appropriate merge correction windows. The projection windows used in this embodiment of the invention are superimposed on the image data with the phasing as shown in FIGS. 3, 4 and 5. That is, the top left-hand pel of the page of image data to be projected to the lower resolution is in the top left-hand corner of a 2×2 projection window. The relative positions of the scale change boundaries do not change with respect to the image data and may be thought of as accompanying the image data through the shift registers. Thus, a 2-pel window boundary may be considered to exist between the second or third pel as it enters the first stage SR1-1 of the shift registers, a 3-pel window boundary between the fifth and sixth pel, the next 2-pel boundary between the seventh and eighth pel, and so on. The same applies in the vertical direction. Thus, the first 2-pel boundary lies between the second and third row of pels, the first 3-pel boundary between the fifth and sixth rows, the second 2-pel boundary between the seventh and eighth row of pels, and so on.

Figure 53A:
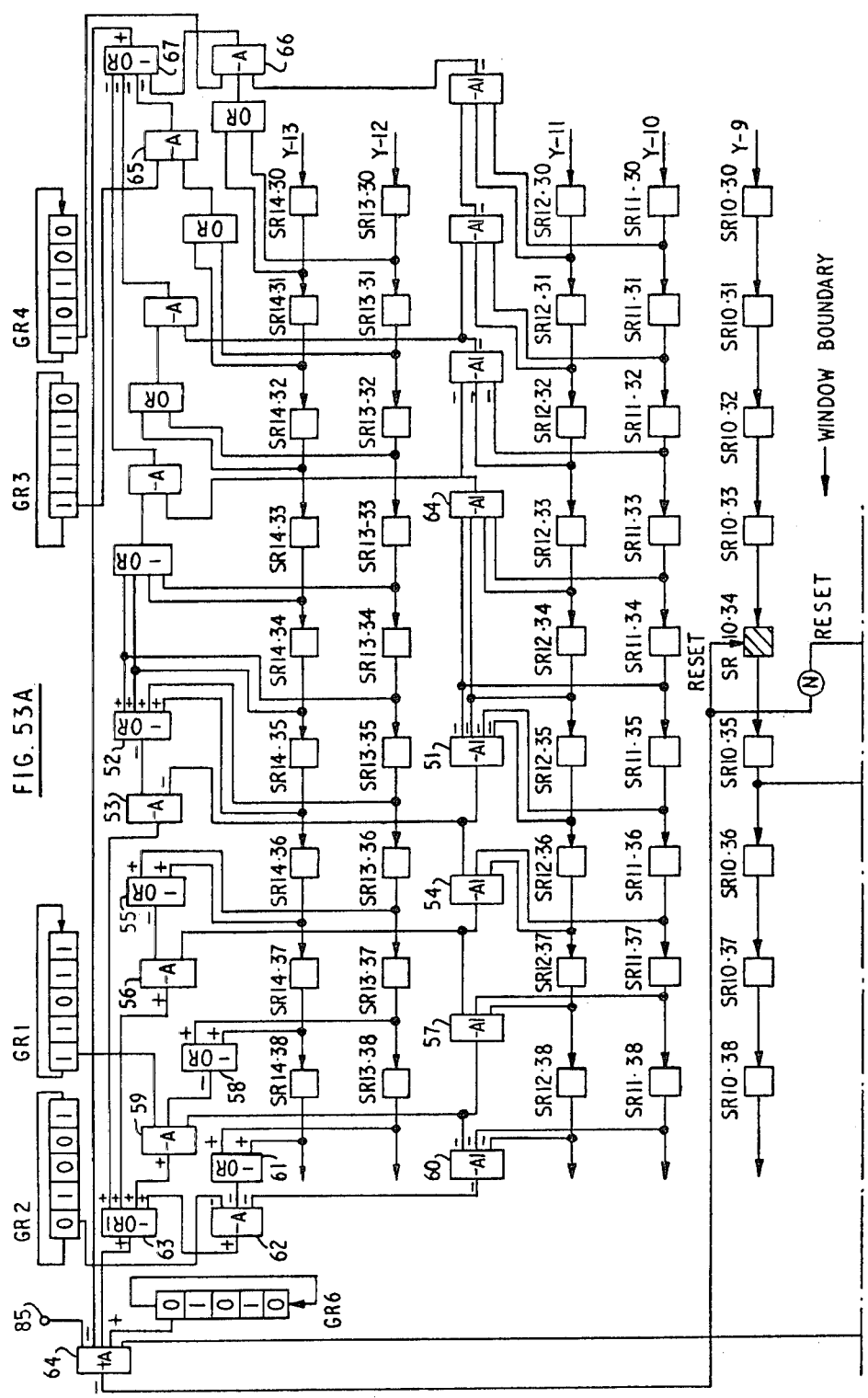

The merge correction circuits for a downward pel movement are shown for convenience as two parts which together form FIG. 53. The logical circuits for detecting stimuli conditions for pel movement are shown in FIG. 53A and those for detecting inhibit conditions in FIG. 53B. For convenience, the row of pels including the pel under investigation is only shown in FIG. 53A. The logical windows for detecting stimuli for a downward are as described previously for a left move in FIG. 43 but rotated through ninety degrees. The logical windows for detecting inhibit conditions are as described with reference to FIG. 44, also rotated through ninety degrees.

FIG. 53 shows the section of shift register stages which are required by the downward merge correction logic. The pel under investigation is contained in shift register stage SR10-34 and as mentioned, is shown for convenience in both parts of FIG. 53. The output from a shift register stage is positive when a black pel is stored and negative when a white pel is stored.

The basic window configuration for a stimulus requires that a 2×2 pel gap is present above and to the left or right of the pel under investigation. Thus considering first of all the left half of the circuits, shift register stages SR11-34, SR11-35, SR12-34 and SR12-35 are connected to negative inverting AND (−AI) gate 51 (negative inputs produce a negative output) which has a negative output when the required gap is present. The stimuli conditions further require at least one black pel to be present in the four pel positions occupying stages SR13-34, SR13-35, SR14-34 and SR14-35. Accordingly, these stages are connected to negative OR (−OR) gate 52 (positive inputs produce a negative output) which has a negative output if the stimulit is preset. The outputs of (−AI) gate 51 and (−OR) gate 52 are connected to negative AND (−A) gate 53 (negative inputs produce a positive output) which produces a positive output when the basic stimuli window conditions are satisfied.

This basic window is extended to include pels in the next column to the left and the extended window tested simultaneously. Thus the gap conditions are tested by connecting the outputs from stages SR11-36 and SR12-36, together with the output from (−AI) gate 51 to (−AI) gate 54. A negative output from (−AI) gate 54 indicates that the gap is present. The stimuli conditions are tested by connecting stages SR13-36 and SR14-36 to (−OR) gate 55. A negative output from (−OR) gate 55 indicates that the stimulus is present. The outputs from (−AI) gate 54 and (−OR) gate 55 are connected to (−A) gate 56 which provides a positive output when the first extended window conditions are satisfied. Whether or not the windows are extended further to the left to include pels in the third and fourth columns depends upon the phase of the projection windows with respect to the image data as has already been explained. The selection of these two extended windows is controlled by window gating signals, the derivation of which will be described later. At this time it is sufficient to note that the window is extended to three columns to the left by connecting stages SR11-17 and SR12-37, together with the output from (−AI) gate 54 as inputs to (−AI) gate 57 and stages SR13-17 and SR14-37 as inputs to (−OR) gate 58. The outputs from (−AI) gate 57 and (−OR) gate 58 are connected as inputs to positive AND (−A) gate 59. A gating signal for selection of this window is obtained from the last stage of gating register GR1 which is also connected as an input to (−A) gate 59. A positive output from (−A) gate 59 indicates that the window conditions for the pels three columns to the left of the investigated pel are satisfied.

Extension of the window to its maximum dimensions to include pels four columns away is also under control of gating signals. As before stages SR11-38 and SR12-38 together with the output from (−AI) gate 57 are connected as inputs to (−AI) gate 60 and stages SR13-38 and SR14-38 are connected as inputs to (−OR) gate 61. The outputs from these latter two gates are connected as inputs to (−A) gate 62 which also receive gating signals from the last stage of gating shift register GR2. A positive output from (+A) gate 62 indicates that the window conditions for the pels four columns to the left of the investigated pel are satisfied. The three left-hand window outputs from (−A) gate 53, (−A) gate 56, (−A) gate 59 and (−A) gate 62 are connected to negative inverting OR (−ORI) gate 63 (positive inputs produce a positive output) a positive output from which indicates that a left-hand window stimulus condition has been detected. The output from (−ORI) gate 63 is applied as one input to positive AND (+A) gate 64 (positive inputs give a negative output).

Identical circuits detect right-hand stimuli conditions, and since the function of each block is identified in the figure, a detailed description of the operation of the logic will not be given. As for the lefthand windows, gating signals are required to extend the windows to include the last two columns of pels dependent upon projection window phasing. Thus, a gating signal from gating shift register GR3 is supplied to (−A) gate 65 to control the selection of the window extended to include pels three columns to the right of the investigated pel and a gating signal from gating shift register GR4 is supplied to (−A) gate 66 to control the selection of the window extended to its maximum dimension to include pels four columns to the right. A positive output from (−ORI) gate 67 indicates that a right-hand window stimulus condition has been detected. The output from (−ORI) gate 67 is applied as another input to (+A) gate 64.

Each gating shift register GR1-4 is connected as a closed loop and contains a predetermined pattern of binary ONE bits. The patterns are clocked one stage around the registers each pel time. A gating signal is derived from the last stage of each register whenever a binary ONE is present in that stage. The gating signals from the gating registers are supplied as negative signals to suit the window logic requirements.

Figure 54:
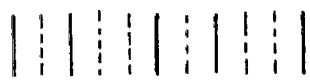
FIG. 54 shows various set patterns for gating registers forming part of the circuits shown in FIG. 53.

All four gating registers are set with their respective patterns each time the first pel of a new row of image data enters shift register stage SR3-4, that is, the stage containing the first investigated pel of the image slice. In order to determine the required gating register patterns, the relative position of the pel under consideration, in this case for downward merge correction, in shift register stage SR10-34 with respect to the projection window boundaries needs to be known. The current investigated pel in stage SR10-34 is horizontally displaced from the first investigated pel in stage SR3-4 by thirty pels. Accordingly, the phase of the current pel with respect to the projection window boundaries is the same as the phase of the first investigated pel. Since the first pel of the image data is located to the left of a 2-pel projection window, all gating registers are set with a pattern reflecting this condition. The set patterns for all horizontal gating registers and two vertical gating registers to be described later are shown in FIG. 54. The projection window boundaries are shown at the top of the figure.

Gating register GR1 provides gating pulses for the selection of the pel window extended three columns to the left. From FIG. 43 it is seen that this window is always required except when the pel under investigation is in the right-hand pel position of a 3-pel projection window. The set pattern for register GR1 is therefore 11011. The pel window extended four columns to the left is only required when the investigated pel is in the right-hand pel position of a 2-pel or 3-pel projection window. The set pattern for register GR2 is therefore 01001. Similarly, the reset pattern for register GR3 selecting the pel window extended three columns to the right is 11110 and that for register CR4 selecting the window extended four columns to the right is 10100.

The inhibit logic shown in FIG. 53B operates in much the same manner as the above described stimuli logic. Reference to FIG. 44 shows that a black pel in any one of the positions occupying shift register stages SR6-32 to SR6-36, inclusive, or SR5-32 to SR5-36, inclusive, is an inhibit to merge correction of the pel under investigation. Accordingly, the outputs from these ten stages are connected as inputs to (−OR) gate 68, a negative output from which indicates the existence of an inhibit condition.

The inhibit windows are symmetrical about the investigated pel and, as with the stimuli logic, only the left-hand window logic will be described. Selection of extended inhibit windows to include pels three and four columns to the left of the investigated pel is performed by gating signals derived from the gating shift registers GR1-GR4. For convenience, these registers are shown as separate registers in FIG. 53B. Thus, for the first extended window, stages SR5-37 and SR6-37 are connected to (−OR) gate 69, the output from which is connected as one input to (−AI) gate 70. Negative gating signals are supplied to a second input of (−AI) gate 70 from the last stage of gating register GR1. A negative output form (−AI) gate 70 indicates that the extended window conditions are satisfied.

The inhibit window is further extended to include pels four columns to the left of the investigated pel by connecting stages SR5-38 and SR6-38 to (−OR) gate 71, the output of which is connected as one input to (−AI) gate 72. Negative gating signals are supplied to a second input of (−AI) gate 72 from the last stage of gating register GR2. A negative output from (−AI) gate 72 indicates that the extended window inhibit conditions are satisfied. The logic for the corresponding right-hand extended window selection is identical and will not be described.

From FIG. 44 and the related description, it will be seen that the inhibit conditions are extended to pels in the row (Y-6) dependent on vertical projection window phasing. Specifically, the row is included when it is located in the top of a 3-pel projection window. Vertical window gating signals are generated by gating shift register GR5. Thus, stages SR7-32 to SR7-36, inclusive, are connected as inputs to (−OR) gate 73, the output from which is supplied as one input to (−AI) gate 74.

Negative gating signals from gating register GR5 are supplied as a second input to (−AI) gate 74. A negative output from this gate indicates that an inhibit condition exists in the extended row of the basic inhibit window. The window is extended one pel to the left under control of gating signals from gating registers GR1 and GR5 supplied as inputs to (−AI) gate 75. The output from stage SR7-37 is inverted and applied as a third input to this latter gate. A negative output from (−AI) gate 75 indicates that the pel in stage SR7-37 is an inhibit to merge correction. The window is further extended to include the next pel to the left under control of gating signals from gating shift registers GR2 and GR5 supplied as inputs to (−AI) gate 76. The output from stage SR7-38 is inverted and supplied as a third input to this latter gate. A negative output from (−AI) gate 76 indicates that the pel in stage SR7-38 is an inhibit to merge correction.

The gating signals from gating shift register GR5 are provided by a binary pattern which is continuously clocked around the register loop once every scan row time, instead of once every pel time as required for horizontal gating. From FIGS. 29 and 51A, it can be seen than when row (Y-2) contains pels in the top of a 2-pel window, then row (Y-6) is in the bottom of a 2-pel window. Gating of this row of pels is only required when it is the top of a 3-pel window. Accordingly, the binary pattern set in gating register GR5 when the first row of the image data enters row (Y2) is 01000. This pattern is shown in relation to the projection window boundaries in FIG. 54.

The outputs from the various window stages described above are taken to a common connection since any one can be an inhibit to merge correction. Thus, the outputs from (−OR) gate 68, (−AI) gates 70, 72, 74, 75, 76 and corresponding (−AI) gates from the right-hand window extensions are dot OR-ed and supplied as one input to OR gate 77 (negative inputs give a positive output). Thus, a negative input to this gate represents the absence of inhibit conditions.

The window conditions described with reference to FIG. 45 which override the merge inhibits are also tested for. Accordingly, shift register stages SR9-34 and SR9-35 are connected as inputs to negative inverting OR (−ORI) gate 78 (positive inputs give a positive output). A positive output from this gate indicates the presence of a black pel in, or immediately preceding, the pel position to which the pel under investigation may be moved. The output from (−ORI) gate 78 is supplied as input to (+A) gate 79. The output from shift register stage SR10-35 is inverted and applied as second input to (+A) gate 79. A negative output from (+A) gate 79 indicates that the gap and stimulus conditions which take precedence over merge inhibit conditions are present. The output from (+A) gate 79 is therefore supplied as a second input to OR gate 77. The output from OR gate 77 is applied as a further input to (+A) gate 64.

Figure 47:
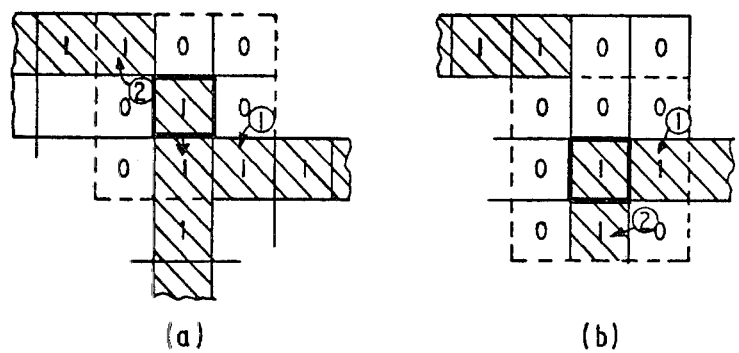
FIGS. 47a and 47b depict connectivity tests performed on the pel under investigation before a merge correction movement is permitted.
Figure 48:
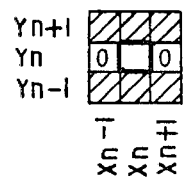
FIG. 48 shows a further window for applying a connectivity constraint during merge correction.

Connectivity tests as described with reference to FIGS. 46, 47 and 48 are performed on the pel under investigation before a merge correction movement is permitted. One test, described with reference to FIG. 46, involves comparing the connectivity counts for the pel pattern in a 3×3 matrix around the investigated pel in its original position with the connectivity county for the new pattern in a 3×3 matrix around the proposed pel position.

Figure 55:
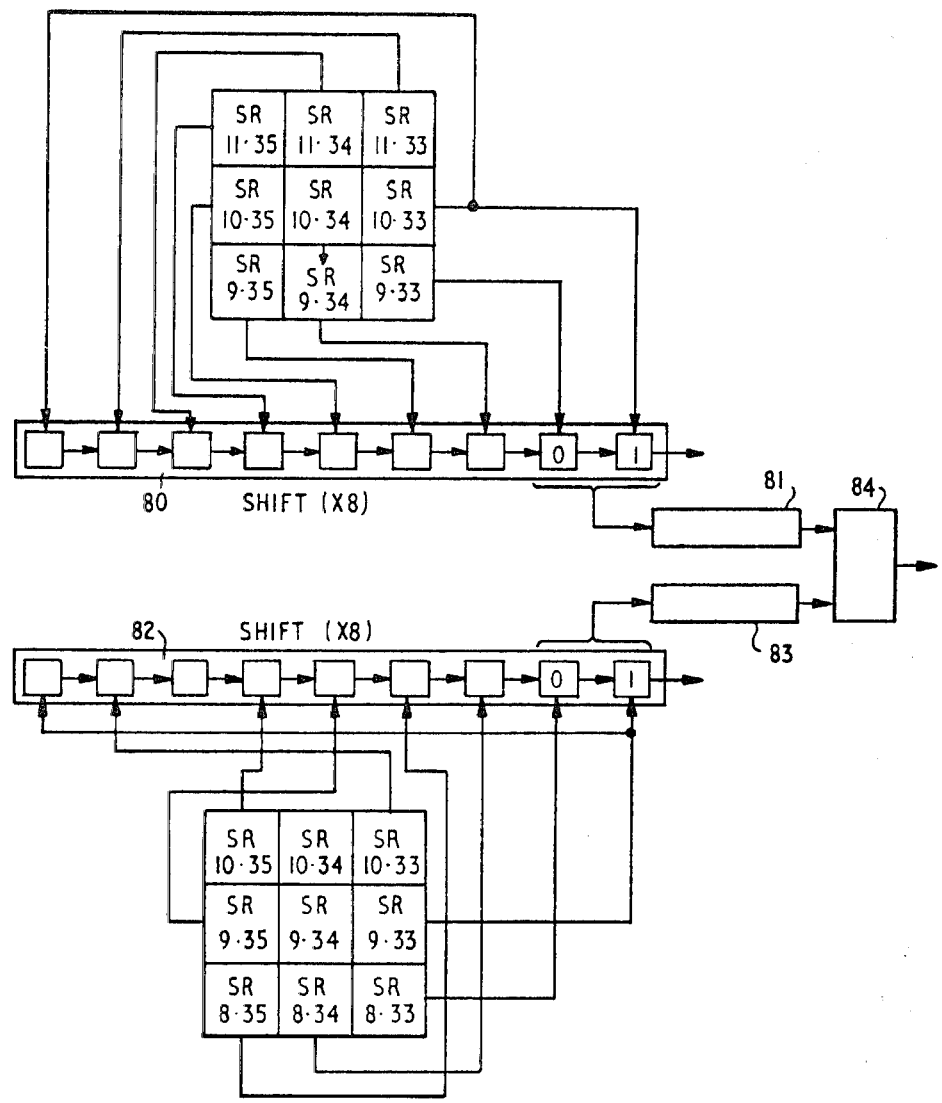
FIG. 55 shows circuits for performing connectivity tests during merge correction.

The circuits for performing the test are shown in FIG. 55. The upper portion of the figure shows the window for a pel under consideration in its original position in shift register SR10-34. The lower portion of the figure shows the window for the proposed position of the pel in shift register stage SR9-34.

The individual state of each of the eight stages surrounding pel SR10-34 is entered into a corresponding location of a 9-stage connectivity shift register 80. The state of one stage, in this case SR10-33, is additionally entered into the ninth stage of the register 80. The connectivity of the pel under investigation is ascertained by counting the number of white to black transitions which occur around the central pel. This is achieved by shifting the contents of the connectivity register eight times to the right and noting the contents of the two right-most stages. Each 01 pattern occurring in these stages indicates a white to black transition and is counted by counter 81.

The individual states of each of the eight stages surrounding pel SR9-34 is similarly entered into shift register 82. Since after merge correction the contents of stage SR10-34 is always zero, this condition is reflected by not making a correction from this stage to the corresponding stage in connectivity register 82. Stage SR9-33 is additionally connected to the ninth stage of register 82. The contents of register 82 are shifted eight times to the right and the occurrence of the pattern 01 in the two right-most stages detected and counted in counter 83. The contents of the two counters 81 and 83 are compared in comparator 84 which produces a positive output when the accumulated total in counter 81 is equal to or less than the total in counter 83. The second connectivity test is also performed on a 3×3 matrix surrounding the investigated pel. The logic requirements for merge inhibit are described with reference to FIG. 48. The logic circuits for performing this simple test is not described but is assumed to produce a positive output when merge correction does not destroy connectivity. The combined output from logic circuits performing this latter test and the output from comparator 84 (FIG. 55) are applied as another input on terminal 85 to (+A) gate 64.

Primary downward merge correction is only performed when the pel under investigation is situated immediately above a projection window boundary. Thus, (+A) gate 64 is connected to gating register GR6 which provides projection window boundary gating signals at approximate times. The binary pattern in this case initially set in register GR6 and clocked around its closed loop once every scan row time is 01010. This pattern is shown in FIG. 54 and can be readily established by considering the relative vertical position of the downward merge correction unit with respect to the image slice. A negative output from (+A) gate 64 is the merge correction accept signal for the down merge correction unit. The signal is used direct to reset stage SR10-34 containing the pel under investigation and after inversion to set the stage SR9-34, or maintain it, in a ONE state.

All other primary merge correction and secondary merge correction units forming the complete data sensitive merge inhibit unit (7) are implemented in the same way as described above. All require stimuli conditions for a move, all are tested for merge inhibit and merge inhibit override conditions, and all are tested for connectivity constraints. From the foregoing description of the down merge correction unit, the corresponding logic circuit requirements for the remaining primary correction units and the two secondary correction units will be clearly apparent and further description of these units will not be given.

Figure 56:
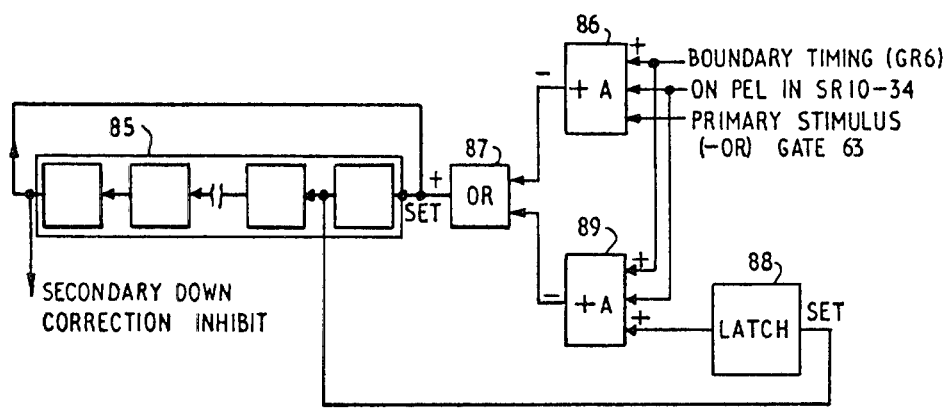
FIG. 56 shows a circuit detail of the downward merge correction unit.

The secondary downward merge correction unit is provided with additional circuitry to inhibit the progressive downward movement of a pel which otherwise could occur due to the correction sequence order of secondary correction before primary correction. The circuitry is shown in FIG. 56 and will now be described.

Shift register 85 has the same number of stages as the image slice registers already described. Each time a pel under investigation is moved by primary downward merge correction, the first stage of the register is set to a 1 state. The signal to set the stage is derived from (+A) gate 86 which produces a negative output in response to positive signals on its three inputs, indicating that an ON pel is in the stage SR10-34; a stimulus for pel movement exists from (−OR) gate 63, and a boundary timing pulse from GR6 is present. The output from (+A) gate 86 is connected as one input to OR gate 87, a positive output from which is used to set the first stage of the register 85.

The stored 1-state is clocked through the register 84 every pel time and therefore reaches the last stage of the register when the associated pel originally in shift register stage SR10-34 has reached stage SR11-33 where it is considered for secondary downward merge correction. A '1' state in this last stage is used to generate a secondary correction inhibit signal which is supplied to the secondary downward correction unit. Progressive downward merge correction is thereby prevented.

As an additional safeguard, the output of the first stage of register 85 is used to set a latch 88 to a corresponding stage, thereby 'remembering' the 1-state during the next pel time. The output from latch 88 is supplied as one input to (+A) gate 89. Boundary timing pulses, together with a signal representing the state of the new pel in stage SR10-34, are supplied as two further inputs to (+A) gate 89. The output of (+A) gate 89 is connected as second input to (OR) gate 89. In the event that this next pel is also ON, the first stage of the shift register 85 is again set to a '1' state even though a stimulus for merge correction may not be present for this pel. Thus, a stream of '1's are propagated through shift register 84 corresponding in number to the pels forming a continuous horizontal black feature in the input image. Similarly, the last stage of register 85 is connected as input to the first stage so that the inhibit condition is maintained for corresponding ON pels in the next row of the slice.

Figure 57:
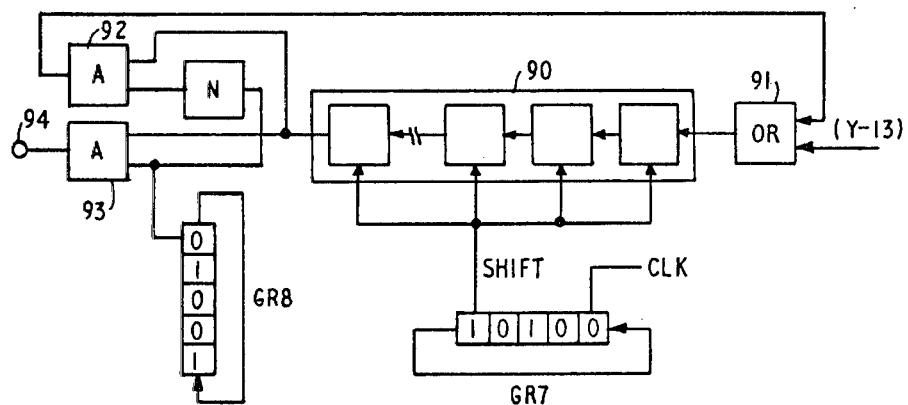
FIG. 57 shows the circuit details of the scale change projector forming part of the data consolidation apparatus.

The pels emerging from the data sensitive merge inhibit unit (7) are applied from shift register stage SR15-43 to the scale change projector (8) shown in FIG. 57. The scale change projector consists of a shift register 90 which is clocked on one stage by window boundary signals derived from gating register GR7. Consideration of the horizontal phasing of the image data in shift register stage 15-43 shows that the binary pattern initially set in register GR7 at the start of an image page scan and clocked each pel time is 10100. Each time a 1 appears at the output of register GR7, shift register 87 is clocked on one stage. Thus, the serial by bit pel stream obtained from stage SR15-43 and applied to the input stage of shift register 90 via OR gate 91 is OR-ed alternately within the first stage as 2-pel and 3-pel combinations, thus providing the desired scale change in a horizontal direction.

Similarly, scale change projection in the vertical direction is under control of a further gating register GR8 which controls the alternate 2-row and 3-row OR combinations of pels within the shift register 90. Thus, a '0' at the output of gating register GR8, is inverted and applied as input to AND gate 92. The output from shift register 90 is applied as second input to AND gate 92 and is transmitted therethrough to a second input of OR gate 91 whenever AND gate 92 is enabled by the presence of a '0' at the output of register GR8. The recirculated row of pels which have already been scale charge projected in the horizontal direction are synchronously combined with the next row of input data as it is correspondingly scale charge projected through the register. The shift register row is supplied as output via AND gate 93 whenever a 1 is present at the output of gating register GR8. Consideration of the vertical phasing of the image data in shift register stage SR15-43 shows that the binary pattern initially set in register GR8 and clocked one position each row line is 01001. The serial bit output at terminal 94 represents the input image at the new lower resolution of 96 pels per inch.

The description of the data consolidation apparatus above has assumed throughout that the input image data is free from unwanted 'noise' in the form of single pels usually present on low quality print. The retention of all the input data including this 'noise' while reorganizing its quantized structure increases the undesirable effect of input noise. Further, distortions of valid data often occur to allow space for the noise pels which are, in fact, unwanted. The desirability of noise rejection depends largely on the quality of the scanned image. However, with a noisy input image, an improvement in the final consolidated output is produced if initially all single pels are removed from the input image. This can be easily achieved by investigating each pel position as it passes through the center of a 3×3 window and deleting all pels which are completely surrounded by ZERO.

The data consolidation apparatus described allows a real time transformation of black/white line images (graphics, characters and handwriting) directly from the threshold output of a scanner. The highly repetitive nature of the logical requirements of the apparatus makes it particularly suitable for implementation in LSI. Although intended for direct operation from scanner data, the apparatus can also be used to consolidate a processor data stream.

The design of the apparatus is rotatable in adapting the rate of selective thinning and merge correction to the level of partial congestion in the input image. The scale charge projection window structure is effective in merge elimination although a number of residual failure conditions remain where input pel structures cannot be retained even though adequate space exists. Overcorrection is mostly absent and therefore the efficiency with which the module utilizes the projection space is good. Distortion introduced by scale charge projection is least where the input image stroke widths are least. The merge correction facility operates with reference to the projection window structure. This technique tends to formalize the line structure of the image to conform to the line structure of the projection grid, particularly in areas of high spatial frequency. The visual effect of this is normally an enhancement in line regularity.

The design of the consolidation apparatus described is for conversion of input data scanned at a relatively high resolution of 240 pels/inch to be displayed at the low resolution of 96 pels/inch. This relatively complex ratio (5:2) for the transformation has been selected for the preferred description because of its comprehensive nature. Clearly, the logic requirements for consolidation apparatus for effecting a simple ratio (2:1) scale charge transformation would be less complex since the window structures would be more simple. For example, secondary merge correction could be dropped. The design of apparatus for effecting scale charge transformations of any selected ratio will be apparent from the above description and all apparatus for effecting such transformations are intended to be included in the scope of the invention as defined by the appended claims.

Having thus described our invention, what we claim as new, and desire to secure by Letters Patent is:

1. A method for preserving continuities and discontinuities among clusters of the same first color valued pels originating in an m × n multicolor valued pel array upon said array being compressed into a smaller p × q size, at least two contiguous first color pels constituting a cluster, the method steps prior to compression include:

detecting a bifurcation between clusters defined by at least one run of consecutive second color valued pels in at least one or more consecutive scan lines through row major order scanning of the m × n array;

upon the detection of a bifurcation, converting first color valued pels lying within a predetermined number of array positions contiguous to said detected bifurcation into second color valued pels.

2. A method according to claim 1 wherein the detecting step further includes the step of additional scanning of the m × n array for detecting clusters at least one pel thick and inhibiting the converting step.

3. A method according to claim 1 wherein the compression of the m × n to a p × q array comprises the steps of:

forming a p × n array from the m × n array, p ≦ m, by encoding each ith scan line in row major order with reference to the ith − 1 scan line through the substitution of a pel of the same color value in a weighted position for each run of two or more same color valued pels; and forming a p × q array from the p × n array, q ≦ n, by the encoding of each rth scan line in column major order with reference to the rth − 1 scan line through the substitution of a pel of the same color valued in a weighted position for each run of two or more contiguous same color valued pels.

4. Data manipulation apparatus for receiving raster-scanned data as a first series of bits indicative of individual objects forming an image at a first picture element (pel) resolution and for converting the data into a second series of bits indicative of the image at a second lower pel resolution, comprising a scale changing means operable on receipt of said first series of input bits to convert selected subgroups of said input bits each into a single output bit, the significance of each output bit being determined by the presence or absence of a bit of a predetermined significance anywhere in the associated subgroup of input bits, the size of the subgroups being determined by the degree of compression required to effect the scale-change from said first to said second pel resolution, and means operable prior to scale-change for investigating bits in adjacent subgroups and selectively to change the significance of one or more of said investigated bits if merging of said objects after scale-change to said lower resolution would otherwise occur.

5. Data manipulation apparatus as claimed in claim 4, in which said means for investigating bits in adjacent subgroups includes data sensitive thinning means operable to detect narrow gaps separating adjacent objects in the input image by a number of pels equal to or less than the number of pels in the largest subgroup selected by said scale-changing means and, in the absence of constraints, to delete selected edge pels of said objects so that the number of pels in the resultant gap is greater than the number of pels in said largest subgroup.

6. Data manipulation apparatus as claimed in claim 4, in which said data sensitive thinning means includes a plurality of individual selective edge thinners each of which is operable to detect a predetermined edge bit of an object adjacent a narrow gap and, in the absence of said constraints, to delete the detected edge bit, said individual selecting edge thinners being arranged in a predetermined order with respect to image data supplied thereto.

7. Data manipulation apparatus as claimed in claim 4, in which said means for investigating bits in adjacent subgroups includes constraint means operable to inhibit changing of significance of one or more of said investigated bits, if as a result of so doing, fragmentation of the associated object would otherwise occur.

8. Data manipulation apparatus as claimed in claim 4, including a plurality of rows of shift registers connected in series to receive said first series of bits, said bits being supplied to the input of a first of said plurality of shift registers to be progressively shifted pel by pel through the registers to the output of a last of said plurality of shift registers, the arrangement being such that the relative row and column positions of pels within the registers correspond at all times to the original row and column positions of those pels in the raster-scanned input image.

9. Data manipulation apparatus as claimed in claim 4 in which the subgroups of bits are divided into sets, one set containing a different number of pels from another set in order that nonintegral valued scale-change may be achieved.

10. Data manipulation apparatus as claimed in claim 4, including data sensitive merge inhibit means operable, in response to predetermined stimuli and in the absence of constraints, to investigate remaining bits representing objects in the input image emerging from said further thinner to move a bit representing the edge of an object in the input image from one subgroup to an adjacent subgroup to prevent merging of that bit with an edge bit of an adjacent object which would otherwise occur after scale-change to said lower resolution.

11. Data manipulation apparatus as claimed in claim 10, in which said merge inhibit means includes a plurality of individual merge correction units, each of which is operable, in the absence of constraints, to move an associated bit in a predetermined direction, said individual merge correction units being arranged to operate in a predetermined order with respect to image data.

12. Data manipulation apparatus as claimed in claim 10, in which the stimulus for merge correction of bits is derived as a result of logical tests performed on bits occupying selected near and adjacent pel positions which indicates that repositioning of the investigated bit will not result in merging with an edge bit of a further adjacent object which otherwise would not occur.

13. Data manipulation apparatus as claimed in claim 12, in which said scale-changing means consists of a shift register connected to receive remaining bits representing objects in the input image emerging from said data sensitive merge inhibit means, stage gating means operable to shift the contents of the register one stage at a time each time a subgroup of pels is received by an input stage of the register, the input stage being set to state representing a bit of said predetermined significance whenever an image bit representing an object is present in the subgroup, register gating means selectively operable to either deliver the contents of the shift register to an output terminal or to recirculate the contents through the shift register, the recirculated image data being applied to the input stage in synchronism with image pels supplied to the input stage from a corresponding subgroup of pels in the current row of scanned image data, the input stage being set as a result to a state representative of said bit of predetermined significance if an image bit representing an object is present in the received subgroup of the current scanned image row or is recirculated from the corresponding position in the previous scanned image row, said register gating means being operable to deliver the contents of the shift register to said output terminal upon passage of a subgroup of rows through the shift register, the selection of the subgroups of pels by said stage gating means and subgroups of rows by said register gating means is such that the image data supplied at said output terminal is at said second lower pel resolution.

* * * * *